United States Patent
Spreen

(10) Patent No.: US 10,155,693 B1
(45) Date of Patent: Dec. 18, 2018

(54) ENVIRONMENTALLY RESPONSIBLE INSULATING CONSTRUCTION BLOCKS AND STRUCTURES

(71) Applicant: The Shredded Tire, Inc., Fort Lauderdale, FL (US)

(72) Inventor: Richard P. Spreen, Fort Lauderdale, FL (US)

(73) Assignee: The Shredded Tire, Inc., Fort Lauderdale, FL (US)

( * ) Notice: Subject to any disclaimer, the term of this patent is extended or adjusted under 35 U.S.C. 154(b) by 0 days.

(21) Appl. No.: 16/059,573

(22) Filed: Aug. 9, 2018

Related U.S. Application Data

(63) Continuation of application No. 15/981,189, filed on May 16, 2018, which is a continuation-in-part of application No. PCT/US2015/061055, filed on Nov. 17, 2015, and a continuation of application No. PCT/US2018/032905, filed on May 16, 2018.

(60) Provisional application No. 62/506,849, filed on May 16, 2017.

(51) Int. Cl.
*C04B 18/22* (2006.01)
*E04B 1/74* (2006.01)
*E04C 1/41* (2006.01)
*E04D 13/155* (2006.01)
*E04D 13/16* (2006.01)

(52) U.S. Cl.
CPC .............. *C04B 18/22* (2013.01); *E04B 1/74* (2013.01); *E04C 1/41* (2013.01); *E04B 2001/746* (2013.01); *E04D 13/155* (2013.01); *E04D 13/16* (2013.01)

(58) Field of Classification Search
CPC ... C04B 18/22; E04C 1/41; E04B 1/74; E04B 2001/746; E04D 13/16; E04D 13/155; Y02W 30/96
See application file for complete search history.

(56) References Cited

U.S. PATENT DOCUMENTS

| 4,799,982 A | * | 1/1989 | Vicino | B28B 7/22 156/71 |
| 5,860,262 A | * | 1/1999 | Johnson | E04B 1/14 52/293.1 |
| 7,073,306 B1 | * | 7/2006 | Hagaman | E04B 1/35 249/20 |

(Continued)

*Primary Examiner* — Brent W Herring
(74) *Attorney, Agent, or Firm* — Nancy J. Flint, Attorney at Law, P.A.; Nancy J. Flint, Esq.

(57) ABSTRACT

Environmentally responsible insulating construction blocks and structures constructed primarily of recycled materials are disclosed. The environmentally friendly construction blocks and structures comprise shredded rubber tire pieces coated with silica fume, slag cement and cement, which are then mixed with water and formed in a mold. A layer of grout or a fireproof material may be disposed on one side of the environmentally responsible insulating construction block. The environmentally responsible insulating construction blocks provide high insulation as well as strength for applications such as green roofing, wall construction and green roofing decks. Environmentally friendly structures can be built by pouring the coated shredded rubber tire pieces into molds to form walls, and then to pour a layer of the coated shredded rubber tire pieces as a roof deck, thereby creating a self-supporting structure in a monolithic pour.

4 Claims, 22 Drawing Sheets

(56) References Cited

U.S. PATENT DOCUMENTS

| | | | | |
|---|---|---|---|---|
| 8,182,605 B2* | 5/2012 | Wallner | ............... | C04B 28/30 |
| | | | | 106/685 |
| 8,535,435 B2* | 9/2013 | Nasrallah | ............... | C04B 28/04 |
| | | | | 106/716 |
| 8,615,938 B2* | 12/2013 | Arbour | ............... | E04B 2/88 |
| | | | | 52/173.3 |
| 9,382,160 B2* | 7/2016 | Al-Ageeli | ............... | C04B 28/02 |
| 9,670,095 B2* | 6/2017 | Al-Aqeeli | ............... | C04B 28/02 |
| 10,059,626 B2* | 8/2018 | Al-Aqeeli | ............... | C04B 28/02 |
| 2003/0125425 A1* | 7/2003 | Lee | ............... | C04B 18/22 |
| | | | | 524/2 |
| 2006/0059825 A1* | 3/2006 | Wiercinski | ............... | C09J 5/00 |
| | | | | 52/506.01 |
| 2008/0098935 A1* | 5/2008 | Roth | ............... | B65D 19/0073 |
| | | | | 108/57.17 |
| 2008/0107852 A1* | 5/2008 | Rubb | ............... | C08J 9/20 |
| | | | | 428/36.5 |
| 2008/0250739 A1* | 10/2008 | Krupinski | ............... | B65D 1/22 |
| | | | | 52/309.4 |
| 2010/0222457 A1* | 9/2010 | Wallner | ............... | C04B 28/30 |
| | | | | 524/4 |
| 2011/0258945 A1* | 10/2011 | Arbour | ............... | E04B 2/88 |
| | | | | 52/173.3 |
| 2014/0087158 A1* | 3/2014 | Ciuperca | ............... | B32B 7/02 |
| | | | | 428/215 |
| 2015/0144032 A1* | 5/2015 | Brush | ............... | C04B 28/02 |
| | | | | 106/730 |
| 2016/0185665 A1* | 6/2016 | Al-Aqeeli | ............... | C04B 28/02 |
| | | | | 524/2 |
| 2017/0226014 A1* | 8/2017 | Al-Aqeeli | ............... | C04B 28/02 |
| 2018/0251402 A1* | 9/2018 | Al-Aqeeli | ............... | C04B 28/02 |
| 2018/0282997 A1* | 10/2018 | Chen | ............... | E04B 1/665 |

* cited by examiner

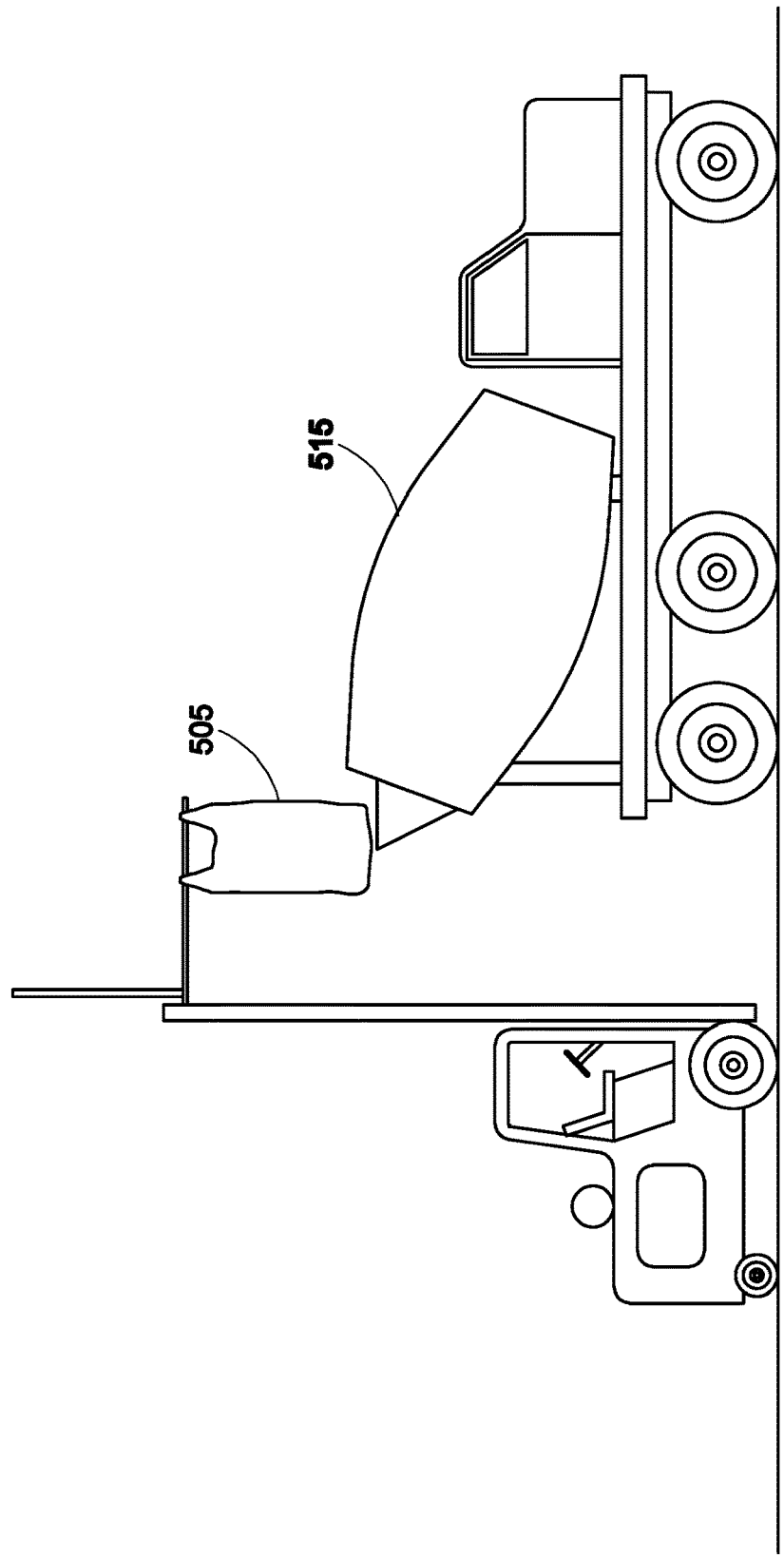

Fig. 7A  Fig. 7B

ENVIRONMENTALLY RESPONSIBLE INSULATING CONSTRUCTION BLOCKS AND STRUCTURES

FIELD OF THE INVENTION

The invention relates to environmentally responsible insulating construction blocks and structures constructed primarily of recycled materials. The environmentally responsible insulating construction blocks and structures comprise shredded rubber tire pieces coated with silica fume, slag cement and cement, which are then mixed with water and formed in a mold. In one embodiment, a layer of grout is disposed on one side of the environmentally responsible insulating construction block for use in a roofing system. In one embodiment, a permeable layer of a fireproof material is disposed on one side of the environmentally responsible insulating construction block. The environmentally responsible insulating construction blocks provide high insulation as well as strength for applications such as green roofing deck construction. Environmentally friendly structures can be built by pouring the coated shredded rubber tire pieces into molds to form walls, and then to pour a layer of the coated shredded rubber tire pieces as a roof deck, therefore forming an entire structure in one single monolithic pour.

BACKGROUND

In many developed countries the construction and use of buildings is a leading consumer of energy and producer of greenhouse gas emissions. Sustainable architecture seeks to minimize the negative environmental impact of buildings by efficiency and moderation in the use of materials, energy, and development space. Sustainable architecture uses a conscious approach to energy and ecological conservation in the design of the built environment Green building (also known as green construction or sustainable building) refers to both a structure and the using of processes that are environmentally responsible and resource-efficient throughout a building's life-cycle, from siting to design, construction, operation, maintenance, renovation, and demolition. Green building rating systems such as BREEAM (United Kingdom), LEED® (United States and Canada), DGNB (Germany), CASBEE (Japan), and VERDEGBCe (Spain) help consumers determine a structure's level of environmental performance. These systems award credits for building features that support green design in categories such as location and maintenance of building site, conservation of water, energy, and building materials, and occupant comfort and health. The number of credits generally determines the level of achievement. Additionally, green building codes and standards, such as the International Code Council's draft International Green Construction Code, are rules created by standards development organizations that establish minimum requirements for elements of green building such as materials or heating and cooling.

Leadership in Energy and Environmental Design (LEED®) is a set of rating systems for the design, construction, operation, and maintenance of green buildings in the United States and Canada which was developed by the U.S. Green Building Council (USGBC). LEED® certification of a building is recognized across the globe as the premier mark of achievement in green building. LEED®-certified buildings cost less to operate, reducing energy and water bills by as much as 40%. Businesses and organizations across the globe use LEED® to increase the efficiency of their buildings, freeing up valuable resources that can be used to create new jobs, attract and retain top talent, expand operations and invest in emerging technologies.

The intent of LEED® is to provide a standard certification process that registers buildings constructed with environmental performance, efficiency, and occupant health and well-being as primary goals. Buildings receive points towards varying levels of certification based on the set of categories established by the USGBC. For example, points are awarded with respect to the following features:

Site development that protects or restores habitat or that maximizes open space;

Storm water design to minimize impervious surfaces;

Heat island effect that uses alternative surfaces and non-structural techniques to reduce imperviousness and promote infiltration, reducing pollutant loadings and use of vegetated roofs;

Water efficiency by use of green roofing system without permanent irrigation or that minimizes potable consumption;

Energy and optimization by establishing the minimum level of energy efficiency for the building and systems; and Materials and resources that reuse building materials and products to reduce demand for virgin materials and reduce waste, use of recycled components and use of regional material that has been manufactured and assembled within 500 miles of the building.

Green roofing systems installed on 50% of more of a roof surface virtually guarantees 2 point toward LEED® certification, and can contribute an additional 7+ points. This is almost 20% of the total number of points needed for a building to be LEED®-certified.

Low slope roofing systems have been developed for use with buildings. Low slope roofing systems commonly include a structural deck made of metal or concrete that is covered with a layer of insulation, and the insulation is then covered with a waterproof membrane. A commercial low slope roof system may use single-ply membranes of prefabricated sheets rolled onto the roof and attached with mechanical fasteners, adhered with chemical adhesives, or held in place with ballast such as gravel, stones, or pavers; built-up roofs consisting of a base sheet, fabric reinforcement layers, and a dark protective surface layer; modified bitumen sheet membranes having one or more layers of plastic or rubber material with reinforcing fabrics, and surfaced with mineral granules or a smooth finish; and spray polyurethane foam roofs constructed by mixing two liquid chemicals together that react and expand to form one solid piece that adheres to the roof then having a protective coating such as metal or tile placed over the polyurethane.

Low slope roofing insulation became more prevalent during the 1960's and forward as increasingly more buildings became air conditioned and as the cost of energy, both for heating and cooling rose dramatically. Currently insulation levels may exceed R30 as specified by code or because of the building's use and geographic location.

Insulated panels are known to be used on wall and roof building applications to form part or all of the building envelope. An insulation panel typically has opposing inside and outside surfaces with an insulating foam core adhered between the surfaces. The panel can then be mounted onto support structures to form the wall or roof application in a building.

In the luxury real estate market, buyers in high rise structures seek living spaces on the roof of the structure for providing such amenities as gardens and pools. A green roof, or living roof, is a roof of a building that is partially or completely covered with vegetation and a growing medium, planted over a waterproofing membrane. It may also include additional layers such as a root barrier and drainage and irrigation systems.

One disadvantage of green roofs is the additional mass of soil and retained water that can place a large strain on the structural support of a building. Some types of green roofs also have more demanding structural standards such as in seismic and hurricane-prone regions of the world. Some existing buildings cannot be retrofitted with certain kinds of green roofing because of the weight load of the substrate and vegetation exceeds permitted static loading. For example, the weight of a green roof caused the collapse of a large sports hall roof in Hong Kong in 2016.

One known way to provide rooftop green spaces for high rises is through the use of Inverted Roof Membrane Assemblies (IRMA), also called a Protected Membrane Roof system (PMR) or a Built-up-Roof (BUR) system. In IMRAs, typically a waterproofing membrane is adhered to the roof structure of the building, then a protective moisture resistant insulation layer is laid to protect the membrane from atmospheric degradation such as sun, wind and rain, and also foot traffic. A layer of mesh may be laid to filter for debris, and the insulation layer is held down with a form of ballast such as gravel wooden decking or paving stones. A camber, or slope, of the roof is created during construction to carry water to a roof drain. An example of a IRMA is shown in FIG. 1.

Tire recycling or rubber recycling is the process of recycling vehicles' tires that are no longer suitable for use on vehicles due to wear or irreparable damage. These tires are a large and difficult source of waste due to the large volume produced, and the fact they contain a number of components that are ecologically problematic. In the United States alone the Environmental Protection Agency (EPA) estimates that roughly 300 million scrap tires are generated annually. Over 60 million of these tires end up in landfills, ocean, lakes, greatly harming our environment. Local recycling facilities are having a very difficult time dealing with this problem because of the enormous quantities of tires being generated each year and with only so many limited re-use options available to them.

The same characteristics that make waste tires problematic—cheap availability, bulk, and resilience—also make them attractive targets for recycling. Tires are known to be recycled for use on basketball courts, in hot melt asphalt, for increasing burning value of RDF in incineration plants and new shoe products.

SUMMARY OF THE INVENTION

The invention relates to an environmentally responsible insulating construction block for green roofing and decking applications as well as environmentally friendly structures. The environmentally responsible construction blocks provide high insulation as well as strength for applications such as green roofing and decking construction. Additionally, environmentally friendly structures can be built in one single monolithic pour.

In one embodiment of the invention, the environmentally responsible insulating construction blocks are adhered to a waterproof membrane that is adhered to the top layer of an insulating layer of a roofing system that is adhered to a roof substrate of a building to provide a green roofing application.

In one embodiment, the environmentally responsible insulating construction blocks are provided in side by side relation to similar environmentally responsible insulating construction blocks and adhered to a roof substrate to provide an insulating layer for a membrane roofing system. A waterproof membrane is glued to the top of the environmentally responsible insulating construction blocks, and the environmentally responsible insulated construction blocks are then adhered to the waterproof membrane for use as a green roofing application.

In one embodiment, environmentally responsible insulating construction blocks are layered with a top layer of permeable fireproof material for use as a green decking application.

In one embodiment, a plurality of environmentally responsible insulating construction blocks is adhered to a waterproof membrane that is adhered to the top layer of an insulating layer of a roofing system that is adhered to a roof substrate of a building to provide a green roofing application. A second layer of environmentally responsible insulating construction blocks having a top layer of a permeable fireproof material are adhered to the top layer of the green roofing application for use as a green decking application. In one embodiment, the tops of the environmentally responsible insulating construction blocks that form the green roofing application are tapered to create a "slope to drain" roofing system. The bottom surfaces of the environmentally responsible insulated construction blocks for green decking application are tapered to correspond to the tapering of the tops of the environmentally responsible insulated construction blocks for green roofing application. The slope of the tops and bottoms of the environmentally responsible insulating construction blocks direct liquids to a roof drain. The permeability of the environmentally responsible insulating construction blocks for green decking application allows for water to pass through and be directed to the roof drain.

The environmentally responsible insulating construction blocks for green decking application comprise a plurality of shredded rubber tire pieces dry mixed with silica fume, slag cement and cement until the shredded rubber tire pieces are coated. Water is then added to the dry coated shredded rubber mixture. A layer of a permeable fireproof material is placed in the mold and the wetted shredded rubber tire mixture is placed in the mold on top of the layer of permeable fireproof material whereupon it dries into an environmentally responsible insulating construction block for green decking application. The dried environmentally responsible insulating construction block for green decking application comprises an open matrix from the top through which liquids such as water can freely pass.

In one embodiment, the permeable fireproof material comprises expanded slate.

The environmentally responsible insulating construction blocks for green roofing application comprise a plurality of shredded rubber tire pieces dry mixed with silica fume, slag cement and cement until the shredded rubber tire pieces are coated. Water is then added to the dry coated shredded rubber mixture. A layer of grout may be placed in the mold and the wetted shredded rubber tire mixture is placed in the mold on top of the layer of grout whereupon it dries into an environmentally responsible insulating construction block for green roofing application. The dried environmentally responsible insulating construction block for green roofing application comprises an open matrix. In one embodiment, the environmentally responsible insulating construction blocks can further comprise insulation foam disposed in the interior open matrix of the blocks.

In one embodiment, the coated shredded rubber tire mixture is poured into molds to form walls for a structure. In one embodiment, the coated shredded rubber tire mixture is poured directly onto a scarified concrete slab. In one embodiment, the coated shredded rubber tire mixture is poured on top of a layer of grout that has been placed on top of a scarified concrete slab. Rods are inserted through the length of the molds so that a top can be placed on the poured coated shredded rubber tire mixture for compression while it dries. The top may be a plywood sheet.

In one embodiment, a layer of coated shredded rubber tire mixture is poured on a plywood layer to form a roof covering. A plurality of rods extends upward from the plywood layer to allow for a top to be placed over the poured coated shredded rubber tire mixture to compress it while it dries.

BRIEF DESCRIPTION OF THE DRAWINGS

The invention will now be described, by way of example, with reference to the accompanying drawings, in which like numerals refer to like elements.

FIGS. 5A-5H depict the steps undertaken in the construction of a structure made entirely of an environmentally responsible insulating mixture of shredded rubber tire pieces coated with silica fume, slag cement and cement, and mixed with water prior to pouring the structure.

FIGS. 7A-7G depict the steps of manufacturing an environmentally responsible insulating construction block for green roofing application according to one embodiment of the invention.

DETAILED DESCRIPTION OF THE INVENTION

Figure 1:
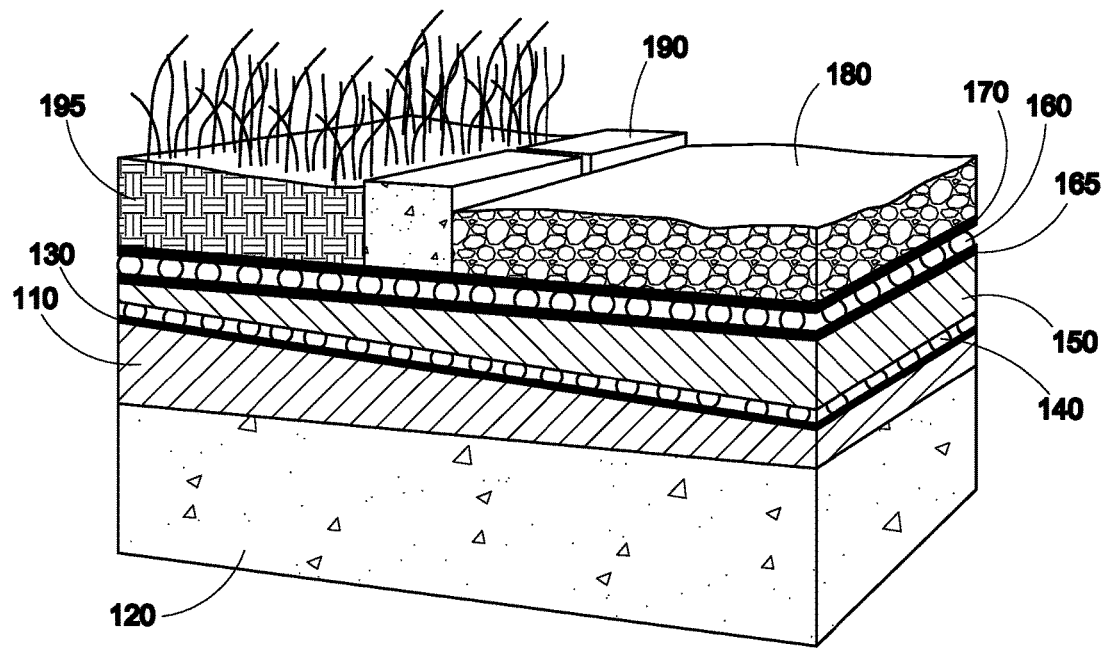
FIG. 1 depicts the construction of a typical IRMA.

The invention relates to environmentally responsible insulating construction blocks for green roofing and green decking applications. The environmentally responsible insulating construction blocks provide high insulation as well as strength. Additionally, environmentally friendly structures can be built in one single monolithic pour.

In one embodiment of the invention, an environmentally responsible insulating construction block is provided for use for green roofing applications. In this embodiment, the environmentally responsible insulating construction block is adhered to a waterproof membrane that is adhered to the top layer of an insulating layer of a membrane roofing system that is adhered to a roof substrate of a building.

Environmentally responsible insulated construction blocks used for green roofing applications comprise coated shredded rubber pieces having a top layer of dried grout that is dried into a block comprising a bottom surface, a top surface, the top surface comprising the grout layer, and four side surfaces substantially perpendicular to the top surface and the bottom surface, wherein the environmentally responsible insulating construction blocks have a thickness defined by the distance between the top surface and the bottom surface. The environmentally responsible insulated construction blocks comprising the coated shredded rubber mixture and dried grout are glued or otherwise adhered to a roof substrate of a building to provide an insulating layer for a membrane roofing system. A waterproof membrane is glued or otherwise adhered to the grout layer of the environmentally responsible insulated construction blocks. The environmentally responsible insulating construction blocks of the invention comprising the coated shredded rubber mixture and a top layer of dried grout are adhered to the waterproof membrane. In one embodiment, the tops of the environmentally responsible insulated construction blocks may be shaped in a manner to induce liquid flow toward a desired direction, for example to a drain.

In one embodiment, the environmentally responsible insulating construction blocks for green roofing application are provided in side by side relation to substantially similar environmentally responsible insulating construction blocks and adhered to a roof substrate to provide an insulating layer for a membrane roofing system. A waterproof membrane is glued to the top of the environmentally responsible insulating construction blocks for green roofing application, and the environmentally responsible insulated construction blocks for green roofing application are then adhered to the waterproof membrane to form a green roof.

In one embodiment of the invention, an environmentally responsible insulating construction block is provided for use for green decking applications. In this embodiment, the environmentally responsible insulating construction block is adhered to a surface to provide a green deck to which growing media or tiles may be adhered. The environmentally responsible insulating construction blocks for green decking application comprise a porous matrix through which water can flow freely.

Environmentally responsible insulated construction blocks used for green decking applications comprise coated shredded rubber pieces that are dried into a block comprising a bottom surface, a top surface, the top surface comprising a permeable fireproof material, and four side surfaces substantially perpendicular to the top surface and the bottom surface, wherein the environmentally responsible insulating construction blocks for decking application have a thickness defined by the distance between the top surface and the bottom surface. The environmentally responsible insulated construction blocks for decking application comprising the coated shredded rubber mixture and permeable waterproof material are glued or otherwise adhered to a substrate of the roof of a building to provide a porous deck to which growing media and/or pavers and tiles can be adhered.

In one embodiment, the permeable fireproof material comprises expanded slate.

In one embodiment, a plurality of environmentally responsible insulating construction blocks for roofing application is adhered to a waterproof membrane that is adhered to the top layer of an insulating layer of a roofing system that is adhered to a roof substrate of a building to provide a green roof. A second layer of environmentally responsible insulating construction blocks having a top layer of a permeable fireproof material are adhered to the top layer of the green roof to form a green deck. In one embodiment, the tops of the environmentally responsible insulating construction blocks for green roofing application are tapered to create a "slope to drain" roofing system. The bottom surfaces of the environmentally responsible insulated construction blocks for green decking application are tapered to correspond to the tapering of the tops of the environmentally responsible insulated construction blocks for green roofing application. The slope of the tops and bottoms of the environmentally responsible insulating construction blocks for roofing application and decking application direct liquids to a roof drain. The permeability of the environmentally responsible insulating construction blocks for green decking application allows for water to pass through and be directed to the roof drain.

In one embodiment, the shredded rubber tire pieces comprise shredded tires. In one embodiment, the shredded rubber tire pieces are shredded to a size such that the steel from the tires is removed but nylon remains in the shredded rubber tire pieces. In one embodiment, the shredded rubber tire pieces are approximately 2 inches nominal size. In one embodiment, the shredded rubber tire pieces have a size greater than approximately ½ inch but smaller than approximately 2 inches. In one embodiment, the shredded rubber tire pieces have a size greater than approximately 1 inch but smaller than approximately 2 inches.

In one embodiment of the invention, the environmentally responsible insulating construction blocks have a thickness (measured from the bottom surface to the top surface) ranging from around 2 inches to around 20 inches, with length and width (measured along the side surfaces) of around 12 inches square. Other dimensions of the environmentally responsible insulating construction blocks may be constructed in accordance with the principles of the invention and these preceding dimensions are listed as examples only and are not intended in any way to limit the invention.

In one embodiment, the green roof and green deck made from the environmentally responsible insulated construction blocks meet building codes designed to withstand severe weather conditions, such as strong winds. 101.4.2 Florida Building Code (FBC), for example, applies to "the construction, erection, alteration, modification, repair, equipment, use and occupancy, location, maintenance, removal and demolition of every public and private building, structure . . . " and sets forth requirements for buildings to withstand wind forces resulting from design wind speeds. In Broward County, Fl., buildings must withstand wind forces of 140 mph, and in Miami-Dade County, Fl., buildings must withstand wind forces of 146 mph. Other standards exist, for example ASCE (American Society of Civil Engineers)-7 and Florida Statute 553.844 setting forth Building Construction Standards titled "Windstorm loss mitigation; requirements for roofs and opening protection." These standards may also apply to roof and deck replacement.

In one embodiment, the coated shredded rubber tire mixture is poured into molds in a monolithic pour to form walls for a structure. In one embodiment, the coated shredded rubber tire mixture is poured directly onto a scarified concrete slab. In one embodiment, the coated shredded rubber tire mixture is poured on top of a layer of grout that has been placed on top of a scarified concrete slab. Rods are inserted through the length of the molds so that a top can be placed on the poured coated shredded rubber tire mixture for compression while it dries. The top may be a plywood sheet.

In one embodiment, a layer of coated shredded rubber tire mixture is poured on a plywood layer to form a roof covering. A plurality of rods extends upward from the plywood layer to allow for a top to be placed over the poured coated shredded rubber tire mixture to compress it while it dries.

Turning to the figures, FIG. 1 depicts a typical IRMA 100. A sloped insulating roofing layer 110 is adhered to a roofing substrate 120. A waterproof membrane 130 is adhered to the top of the roofing layer 110. Insulation 150 is placed on top of drainage space 140. A drainage and vent layer 160 is formed on top of the insulation 150, which may include a root barrier 165. Filter fabric 170 can be placed on insulation 160. A deck can then be formed using gravel 180 and concrete pavers 190. The deck may also include a planting medium 195.

Figure 2:
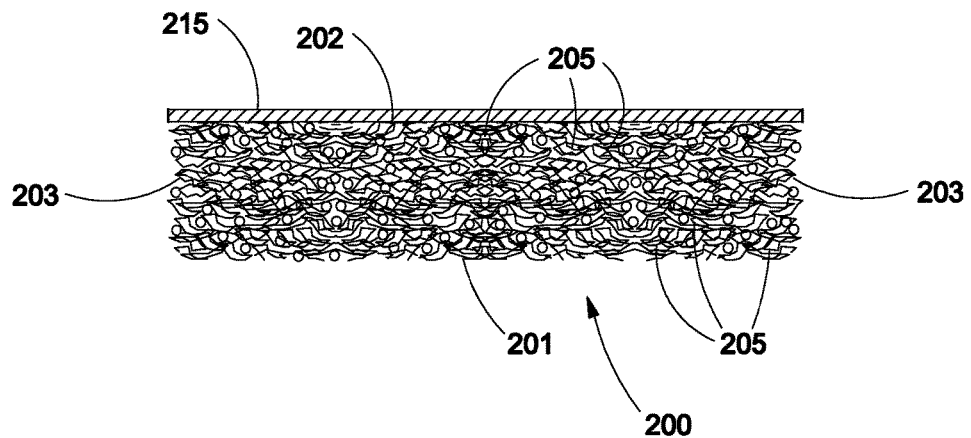
FIG. 2 depicts an environmentally responsible insulating construction block for green decking application according to one embodiment of the invention.

FIG. 2 depicts an environmentally responsible insulating construction block for green decking application 200 comprising a bottom surface 201; a top surface 202 having a permeable layer of a fireproof material 215; and four side walls 203. Shredded rubber tire pieces 205 have been coated with silica fume, slag cement and cement and then mixed with water and dried to form an open matrix in the interior of environmentally responsible insulating construction block for green decking application 200. In one embodiment, the permeable layer of fireproof material 215 comprises expanded slate which has been coated with silica fume, slag cement and cement and then mixed with water, then placed in a mold whereupon the wetted shredded rubber mixture is placed in the mold and dried to form the environmentally responsible insulating construction block for green decking application 200.

FIGS. 3A-3E depict various embodiments of an environmentally responsible insulating construction block for green roofing application topped with an environmentally responsible insulating construction block for green decking application.

Figure 3A:
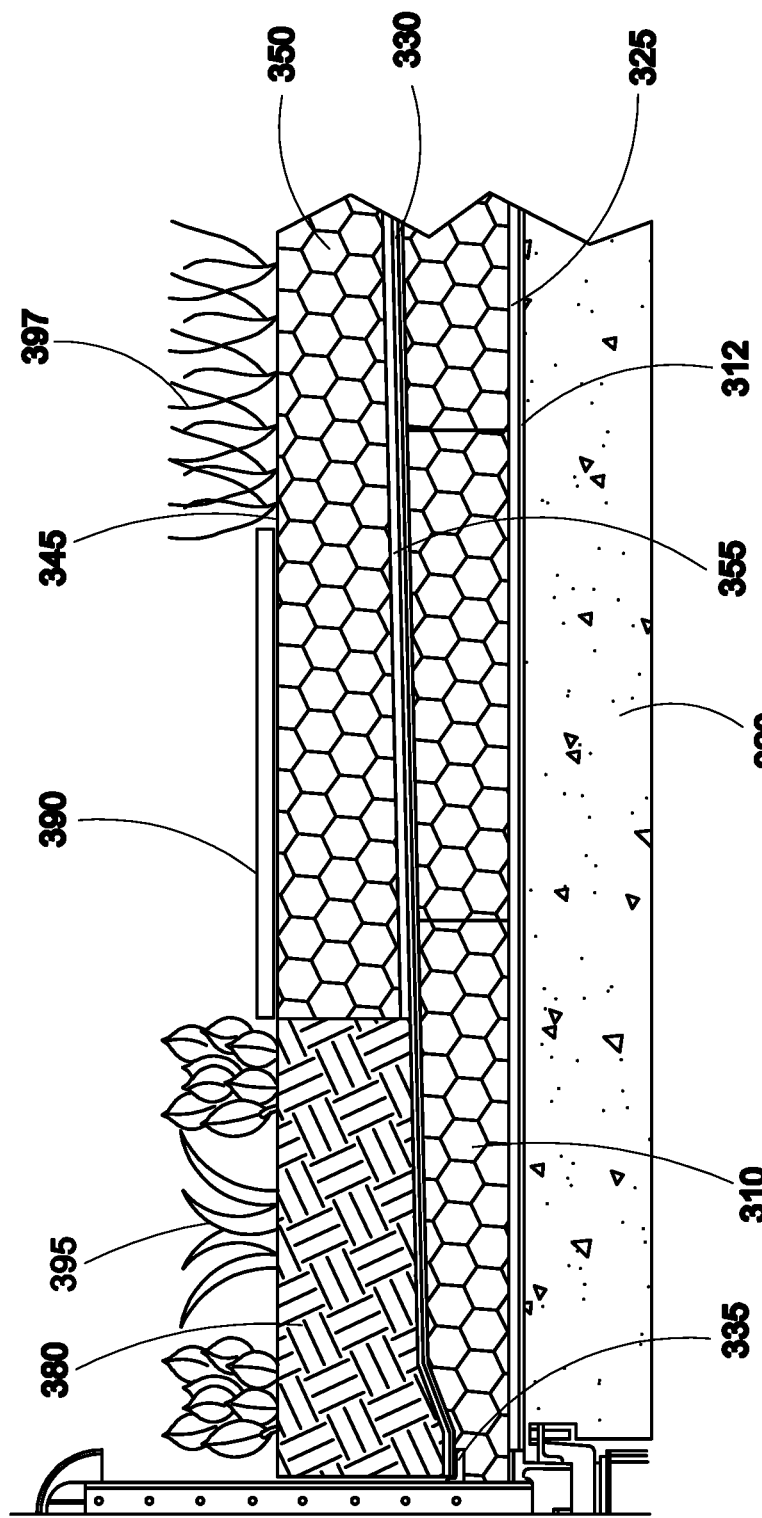
FIGS. 3A-3E depict various embodiments of an environmentally responsible insulating construction block for green roofing application topped with an environmentally responsible insulating construction block for green decking application.

FIG. 3A depicts a side view of an environmentally responsible insulating construction block for green roofing application topped with an environmentally responsible insulating construction block for green decking application. A plurality of environmentally responsible insulating construction blocks for green roofing application is adhered by a layer of adhesive 312 to a layer of insulation 325 on top of a roofing substrate 320 to form a green roof 310. A waterproof membrane 330 is adhered to the top of the green roof 310. A plurality of environmentally responsible insulating construction blocks for green decking application that have been topped with a permeable fireproof material 345, such as coated expanded slate, are placed on top of a layer of grout 355 to adhere to the waterproof membrane 330 to form a green deck 350. Green deck 350 may comprise growing media 380 and/or pavers or tiles 390. Green roofing application 310 may comprise growing media 380 and/or pavers or tiles 390. Green deck 350 may include planting media 395 and/or artificial turf 397. The top surface of green roof 310 may be sloped to drain water that passes through green deck 350 toward a drain 335.

Figure 3B:
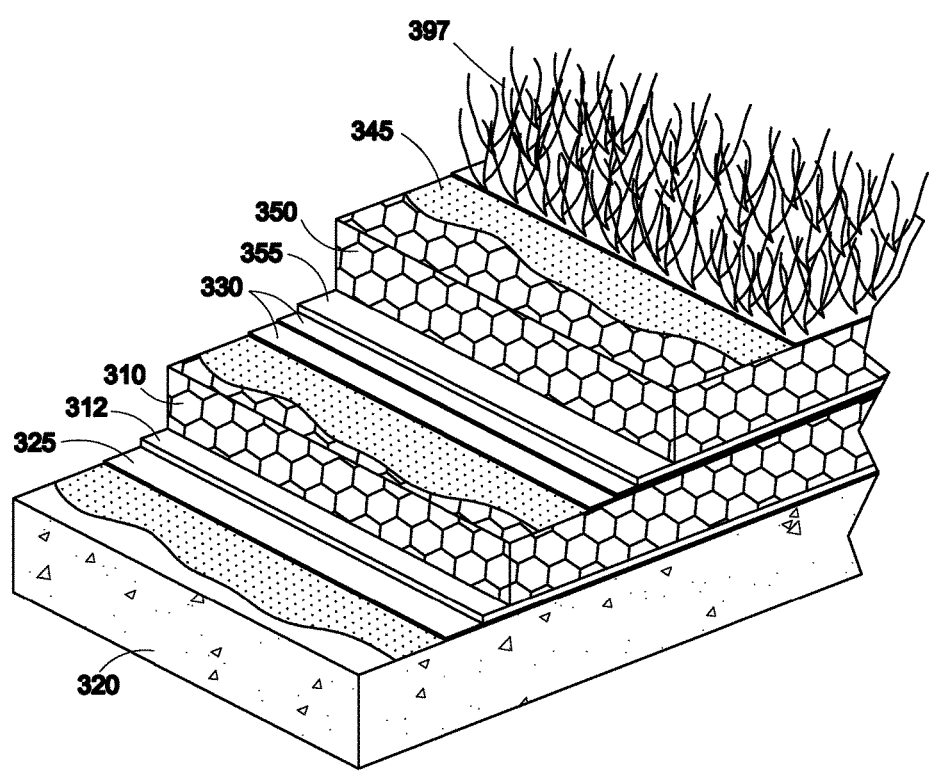

FIG. 3B depicts a cut-away view of one embodiment of an environmentally responsible insulating construction block for green roofing application topped with an environmentally responsible insulating construction block for green decking application comprising turf. Environmentally responsible insulating construction blocks for green roofing application are adhered by a layer of grout 312 to a waterproof membrane 325 on top of a roofing substrate 320 to form a green roof 310. A waterproof membrane 330 is adhered to the top of the green roof 310. A plurality of environmentally responsible insulating construction blocks of coated shredded rubber tire pieces for green decking application that have been topped with a permeable fireproof material 345, such as coated expanded slate, are placed on top of a layer of grout 355 to adhere to the waterproof membrane 330 for use as a green deck 350. Green deck 350 may comprise growing media 380 and/or pavers or tiles 390. Green roof 310 may also comprise growing media 380 and/or pavers or tiles 390. Green deck may include artificial turf 397 that can be bonded to the top of the layer of fireproof permeable material 345.

Figure 3C:
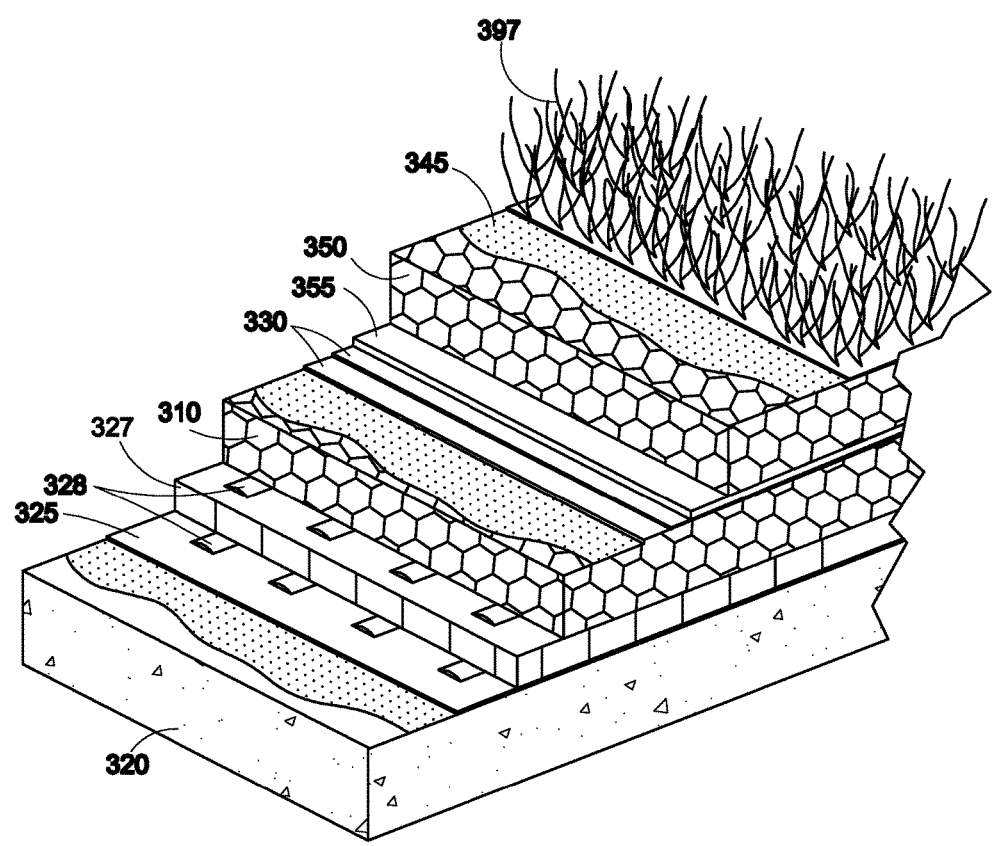

FIG. 3C depicts a cut-away view of one embodiment of an environmentally responsible insulating construction block for green roofing application topped with an environmentally responsible insulating construction block for green decking application comprising turf. Environmentally responsible insulating construction blocks for green roofing application are adhered to a layer of a waterproof membrane 325 on top of a roofing substrate 320 for use as a green roof 310. In this embodiment, an insulation board 327 is adhered to a waterproof membrane 325 by use of adhesive 328. A waterproof membrane 330 is adhered to the top of the green roof 310. A plurality of environmentally responsible insulating construction blocks for green decking application that have been topped with a permeable fireproof material 345, such as coated expanded slate, are placed on top of a layer of grout 355 to adhere to the waterproof membrane 330 to form a green deck 350. Green deck 350 may comprise artificial turf 397 that can be bonded to the top of the layer of fireproof permeable material 345.

Figure 3D:
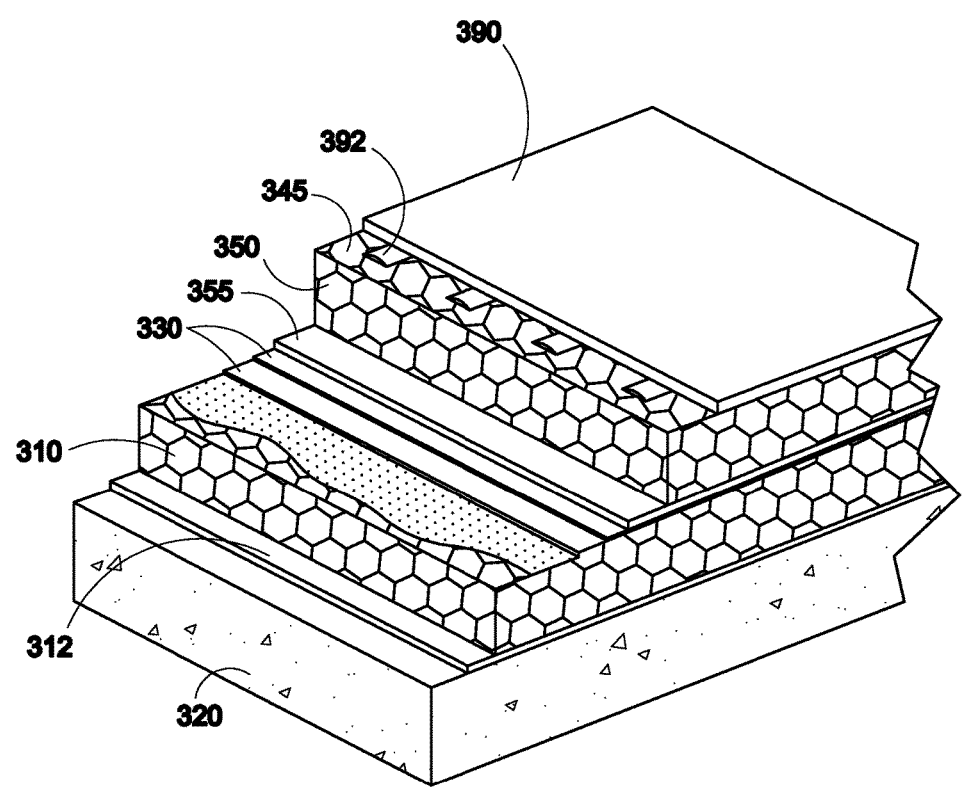

FIG. 3D depicts a cut-away view of one embodiment of an environmentally responsible insulating construction block for green roofing application topped with an environmentally responsible insulating construction block for green decking application comprising pavers or tile. Environmentally responsible insulating construction blocks for green roofing application are adhered on top of a roofing substrate 320 with a layer of grout 312 to form a green roof 310. A waterproof membrane 330 is adhered to the top of the green roof 310. A plurality of environmentally responsible insulating construction blocks of coated shredded rubber tire pieces for green decking application that have been topped with a permeable fireproof material 345, such as expanded slate, are placed on top of a layer of grout 355 to adhere to the waterproof membrane 330 to form a green deck 350. Green deck 350 may comprise pavers or tiles 390 bonded to the top of the layer of fireproof permeable material 345 with adhesive 392.

Figure 3E:
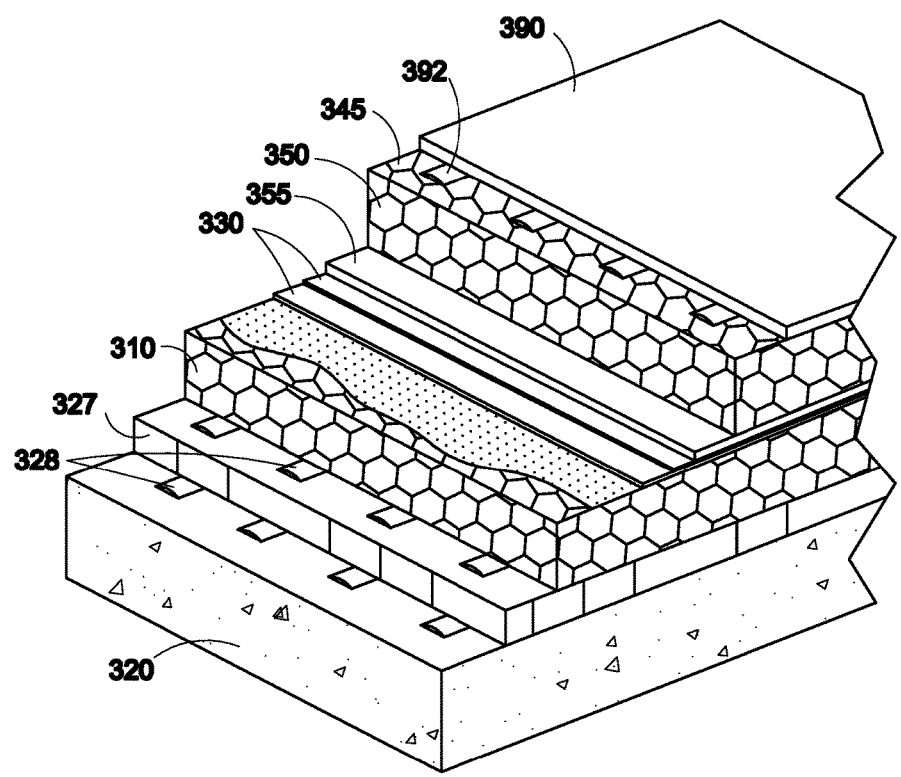

FIG. 3E depicts a cut-away view of one embodiment of an environmentally responsible insulating construction block for green roofing application topped with an environmentally responsible insulating construction block for green decking application comprising pavers or tile. In this embodiment, environmentally responsible insulating construction blocks for green roofing application are adhered to an insulation board 327 and then adhered on top of a roofing substrate 320 using adhesive 328 to form a green roof 310. A waterproof membrane 330 is adhered to the top of the green roof 310. A plurality of environmentally responsible insulating construction blocks of coated shredded rubber tire pieces for green decking application that have been topped with a permeable fireproof material 345, such as coated expanded slate, are placed on top of a layer of grout 355 to adhere to the waterproof membrane 330 to form a green deck 350. Green deck 350 may comprise pavers or tiles 390 bonded to the top of the layer of fireproof permeable material 345 with adhesive 392.

FIGS. 4A-4J depict the steps of manufacturing environmentally responsible insulating construction blocks for green roofing application according to one embodiment of the invention.

Figure 4A:
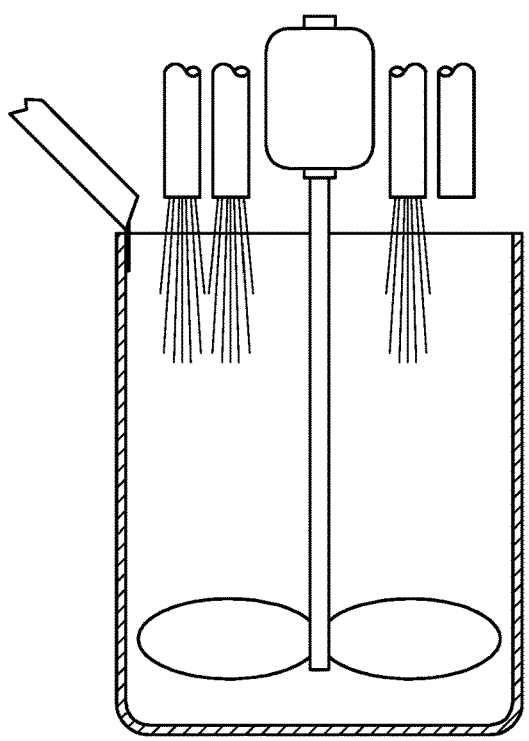
FIGS. 4A-4K depict the steps of manufacturing an environmentally responsible insulating construction block for green decking application according to one embodiment of the invention.

In FIG. 4A, a dry mixture is made from silica fume, slag cement and cement.

Figure 4B:
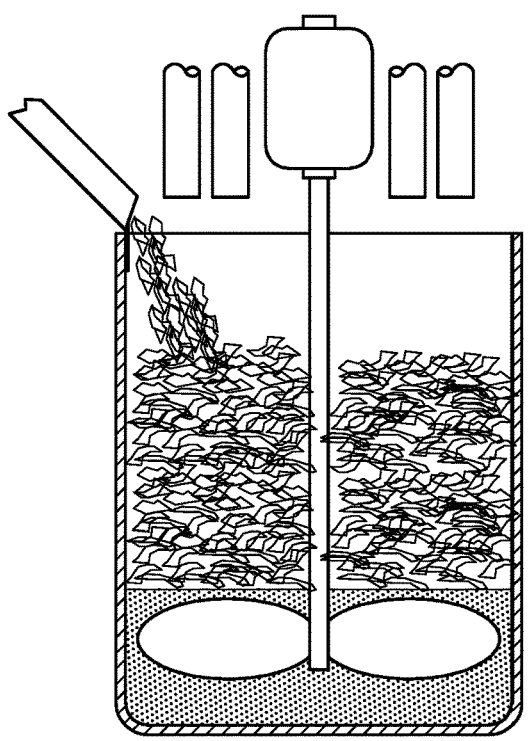

In FIG. 4B, shredded rubber tire pieces are added to the dry mixture and mixed until coated.

Figure 4C:
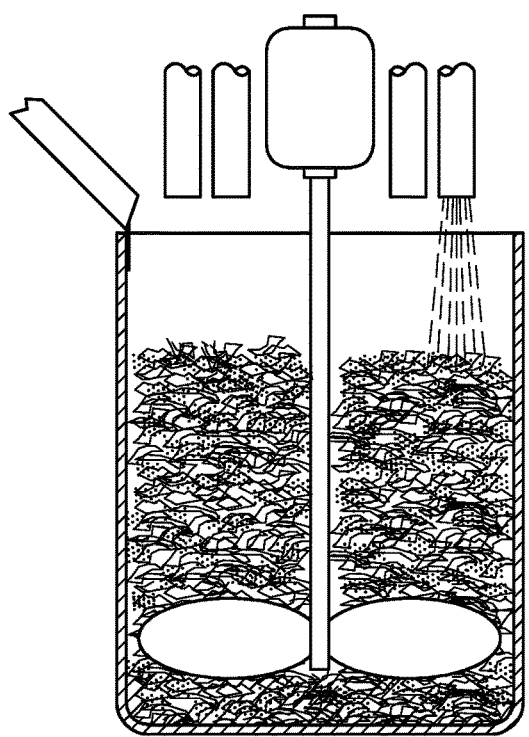

In FIG. 4C, water is added to the dry mix of coated shredded rubber tire pieces until the dry mix is fully wetted.

Figure 4D:
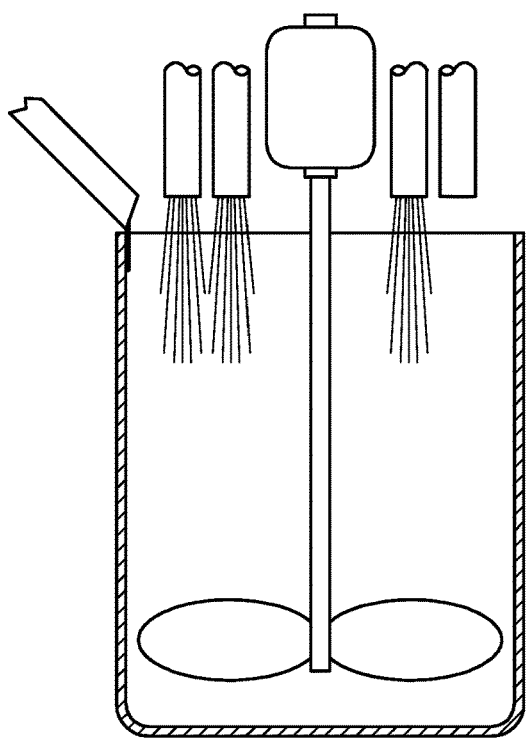

In FIG. 4D, a second dry mixture is made from silica fume, slag cement and cement.

Figure 4E:
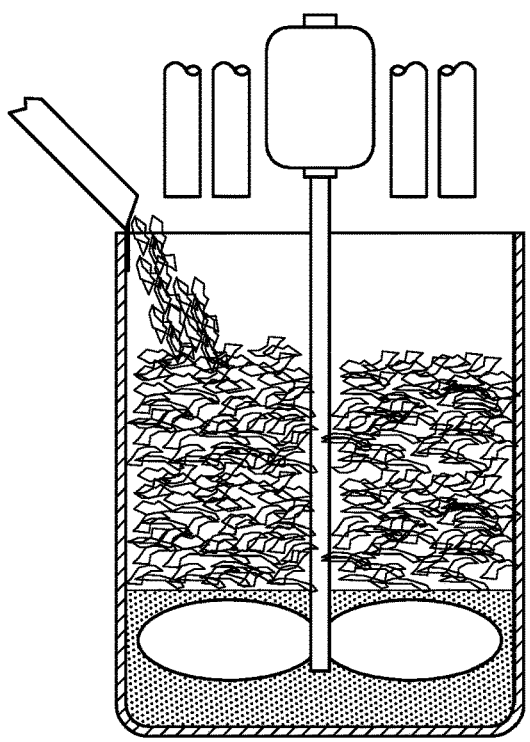

In FIG. 4E, pieces of a fireproof material such as expanded slate are added to the second dry mixture and mixed until coated.

Figure 4F:
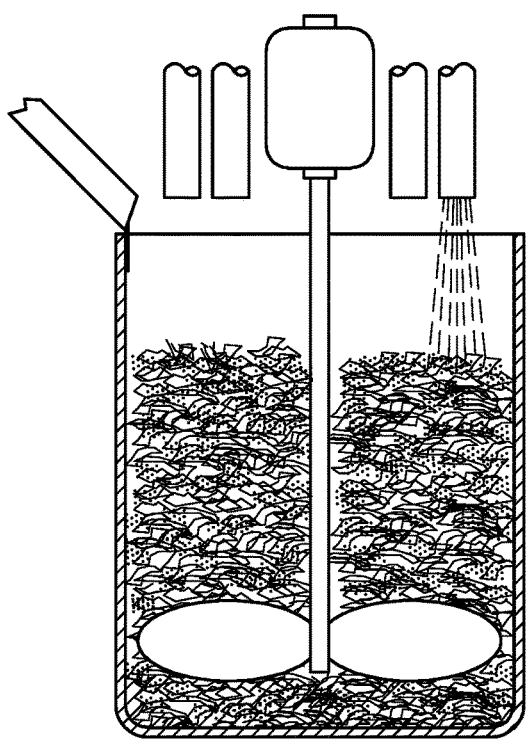

In FIG. 4F, water is added to the dry mix of coated fireproof material until the dry mix is fully wetted.

Figure 4G:

In FIG. 4G, molds are prepared and a layer of the wetted fireproof material mix is added to the bottom of each mold.

Figure 4H:
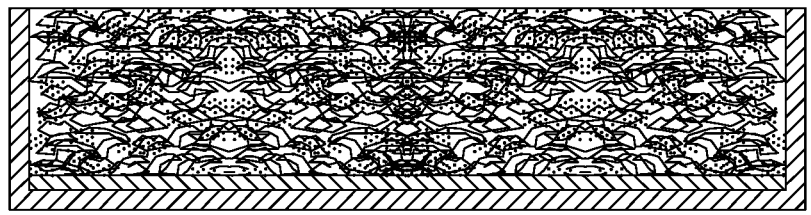

In FIG. 4H, the wetted shredded rubber mix is added into each mold on top of the wetted fireproof material mix.

Figure 4I:
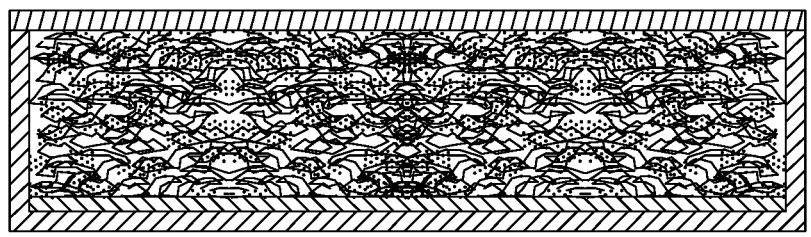

In FIG. 4I, each mold is fitted with a lid and left to sit in ambient air until dry.

Figure 4J:
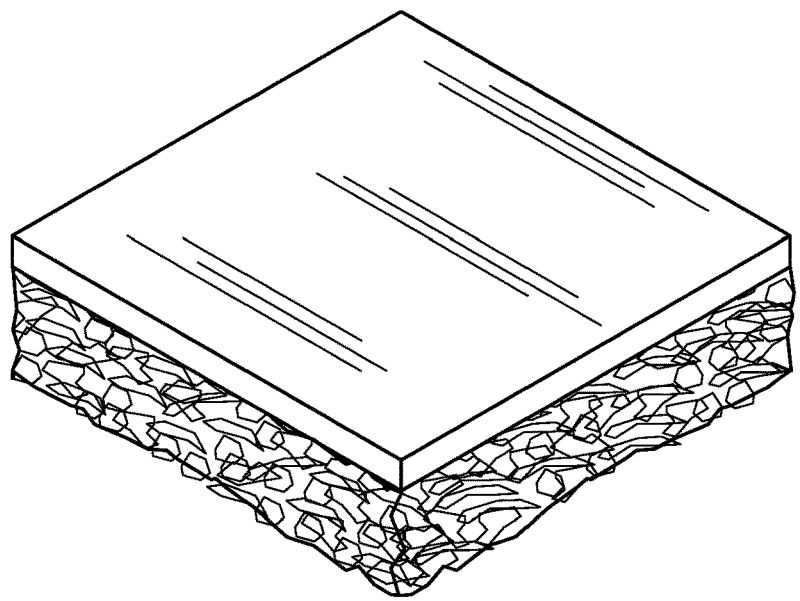

In FIG. 4J, the dried environmentally responsible insulating construction blocks are removed from the molds and are ready for use.

Figure 4K:
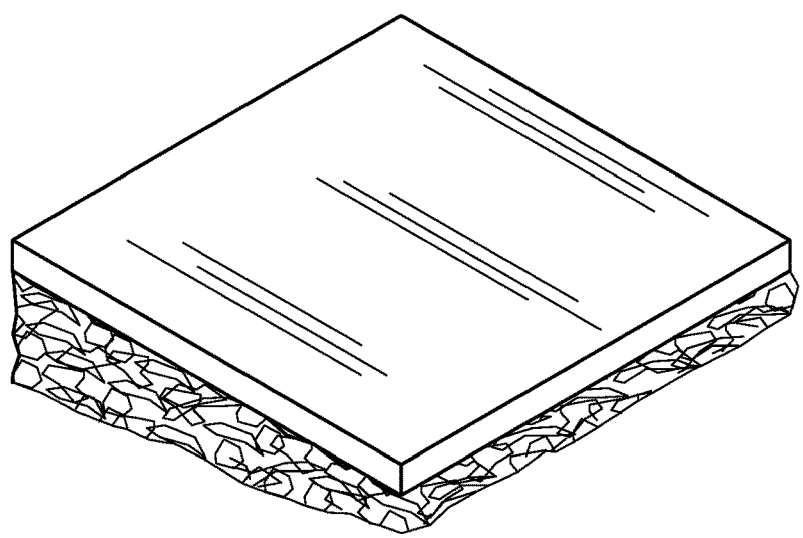

FIG. 4K depicts an alternative mold form, showing a sloped bottom so that the bottom surface of the environmentally responsible insulating construction blocks for use as in a green decking application corresponds to the tapering of the tops environmentally responsible insulating construction blocks for use as in a green roofing application.

The order of mixing of ingredients may be altered as desired by the operator. For example, the shredded rubber tire pieces or waterproof material, such as expanded slate, expanded slate may be placed in the mixer, then the dry mixture of silica fume, slag cement and cement may be added prior to mixing.

FIGS. 5A-5H depict the steps undertaken in the construction of a structure made entirely of an environmentally responsible insulating mixture of shredded rubber tire pieces coated with silica fume, slag cement and cement, and mixed with water prior to monolithic pouring of the structure.

Figure 5A:
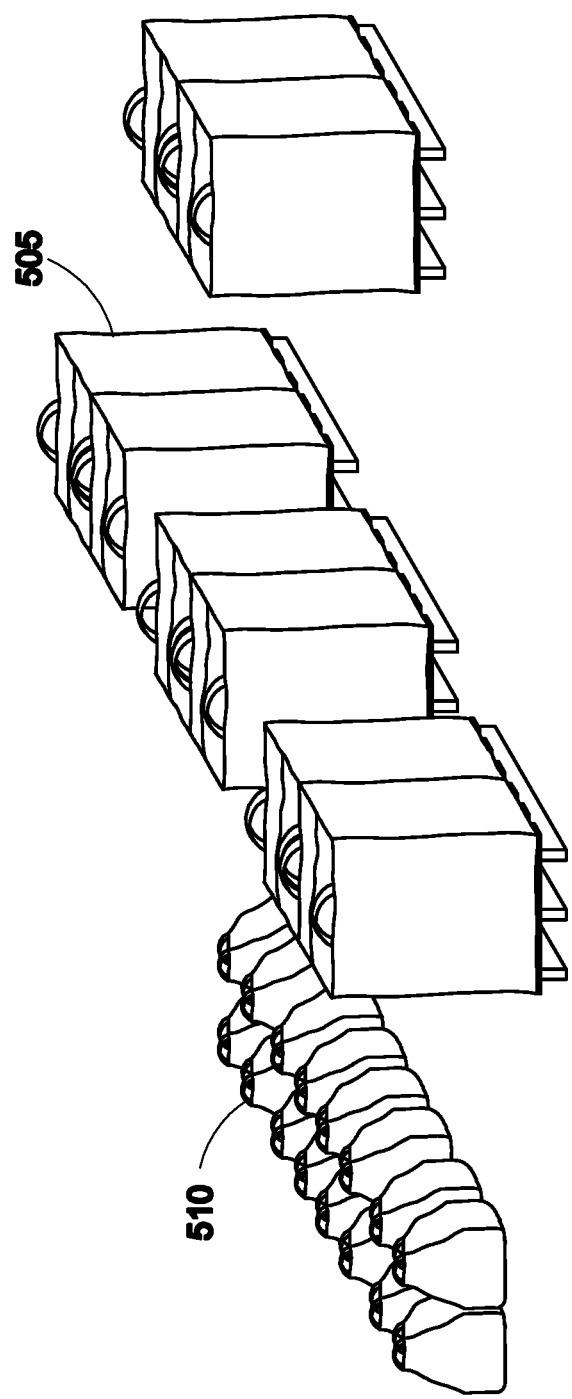

FIG. 5A depicts bags 505 filled with shredded rubber tire pieces 205 having nominal size of greater than approximately 1 inch but smaller than approximately 2 inches and containers 510 filled with a mix of silica fume, slag cement and cement.

FIG. 5B depicts bags 505 filled with shredded rubber tire pieces 205 being added to a mixer 515, wherein they are mixed and thereafter the remaining dry ingredients (silica fume, slag cement and cement) are added and mixed to coat the shredded rubber tire pieces 205.

Figure 5C:
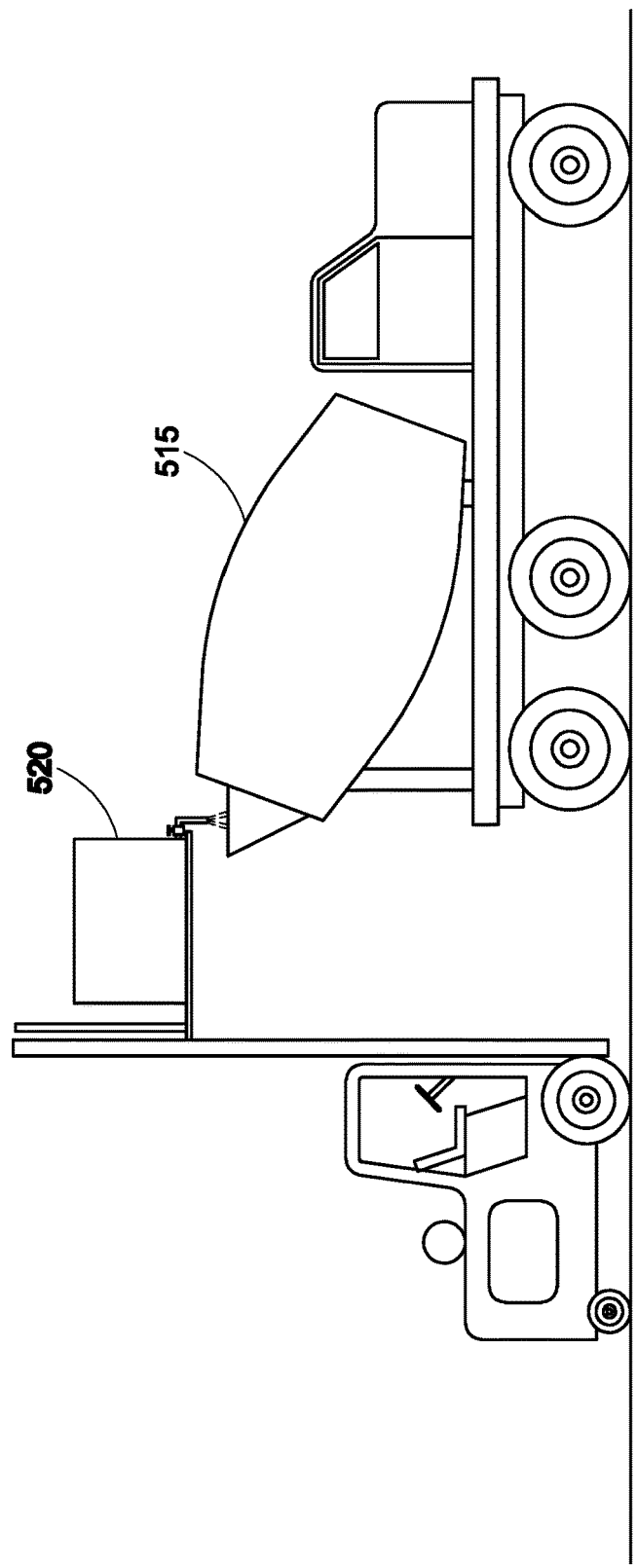

In FIG. 5C, water 520 is added to the coated shredded rubber tire pieces in mixer 515 and mixed.

Figure 5D:
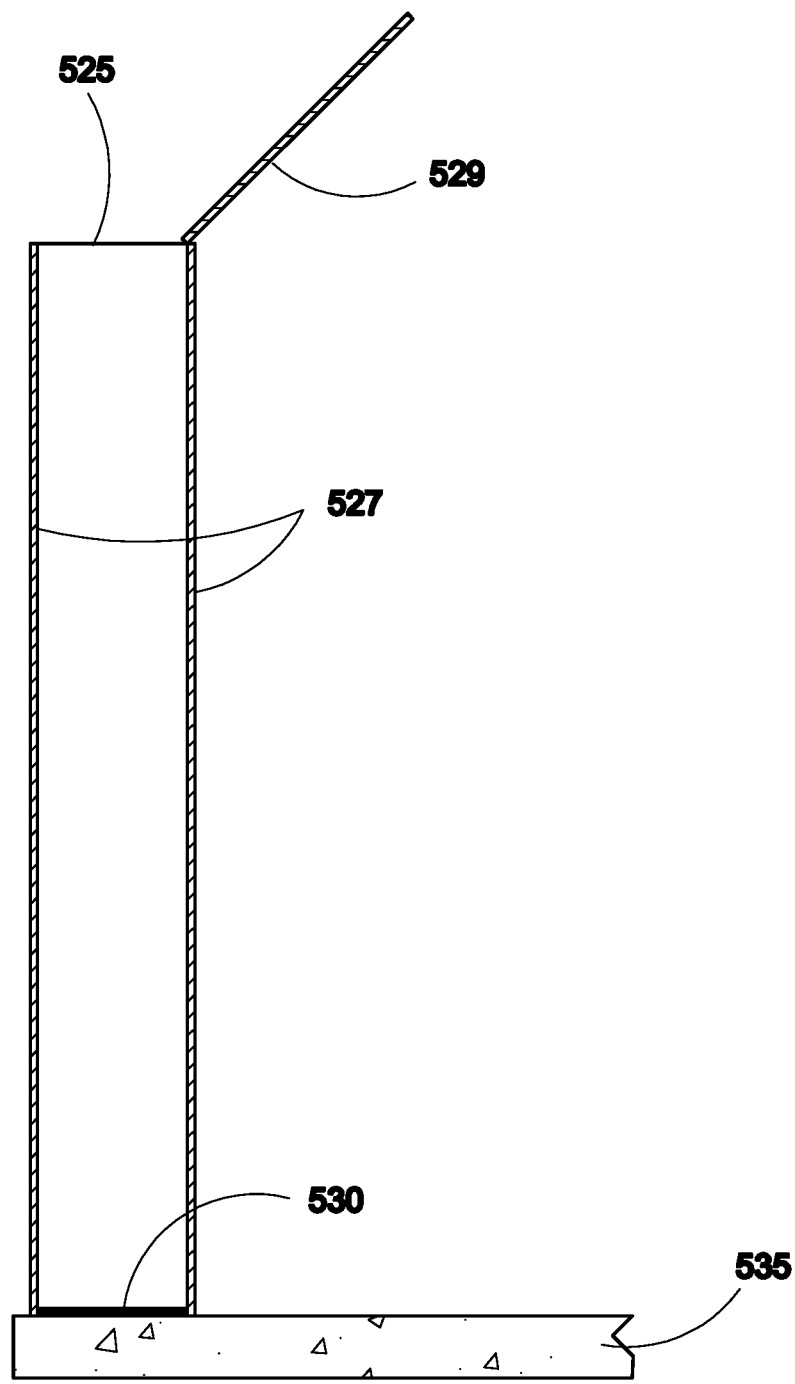

In FIG. 5D, wall molds 525 are built for the walls 527 of the structure upon a foundation, with a layer of grout 530 placed on the foundation 535 at the bottom of each mold. A roof structure 529 is built atop the wall molds 525. Metal rods are placed inside each mold and on the roof structure.

Figure 5E:
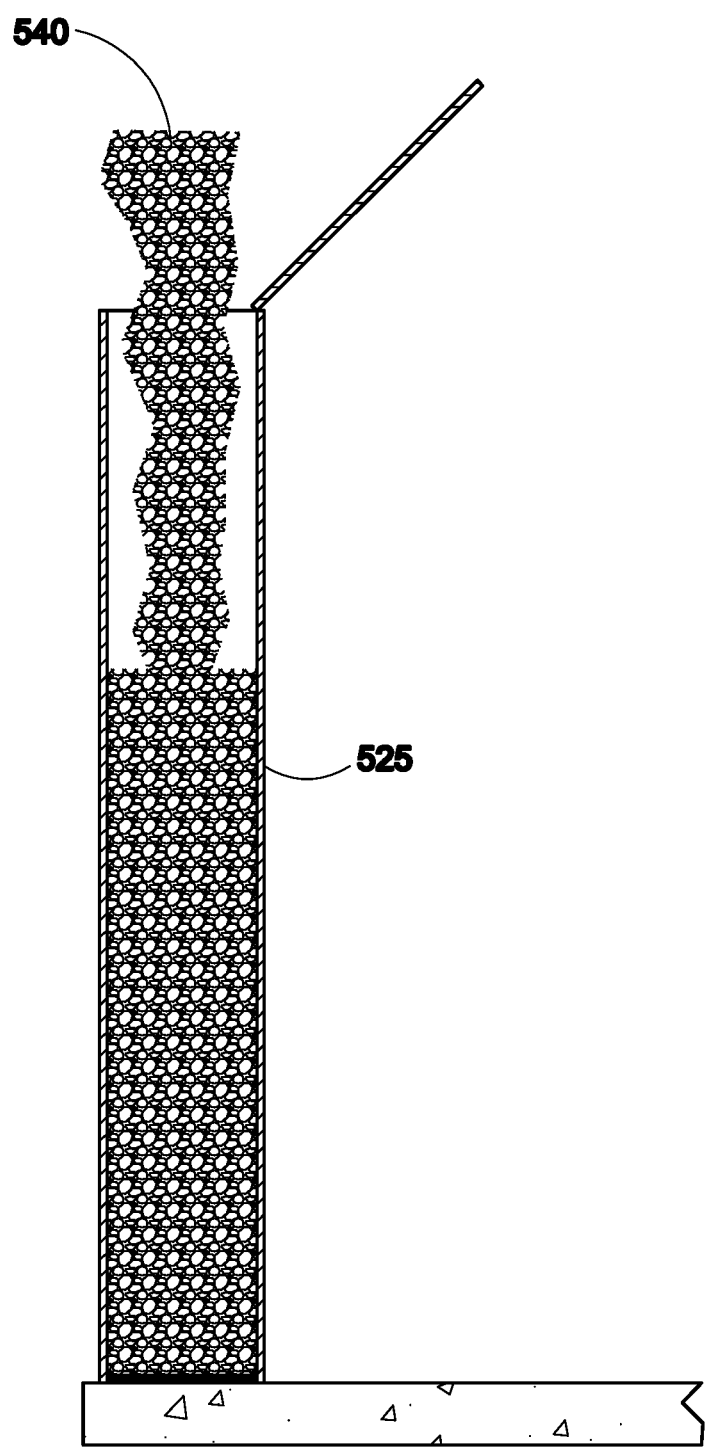

In FIG. 5E, wetted coated shredded rubber tire mix 540 is poured into the wall molds 525.

Figure 5F:
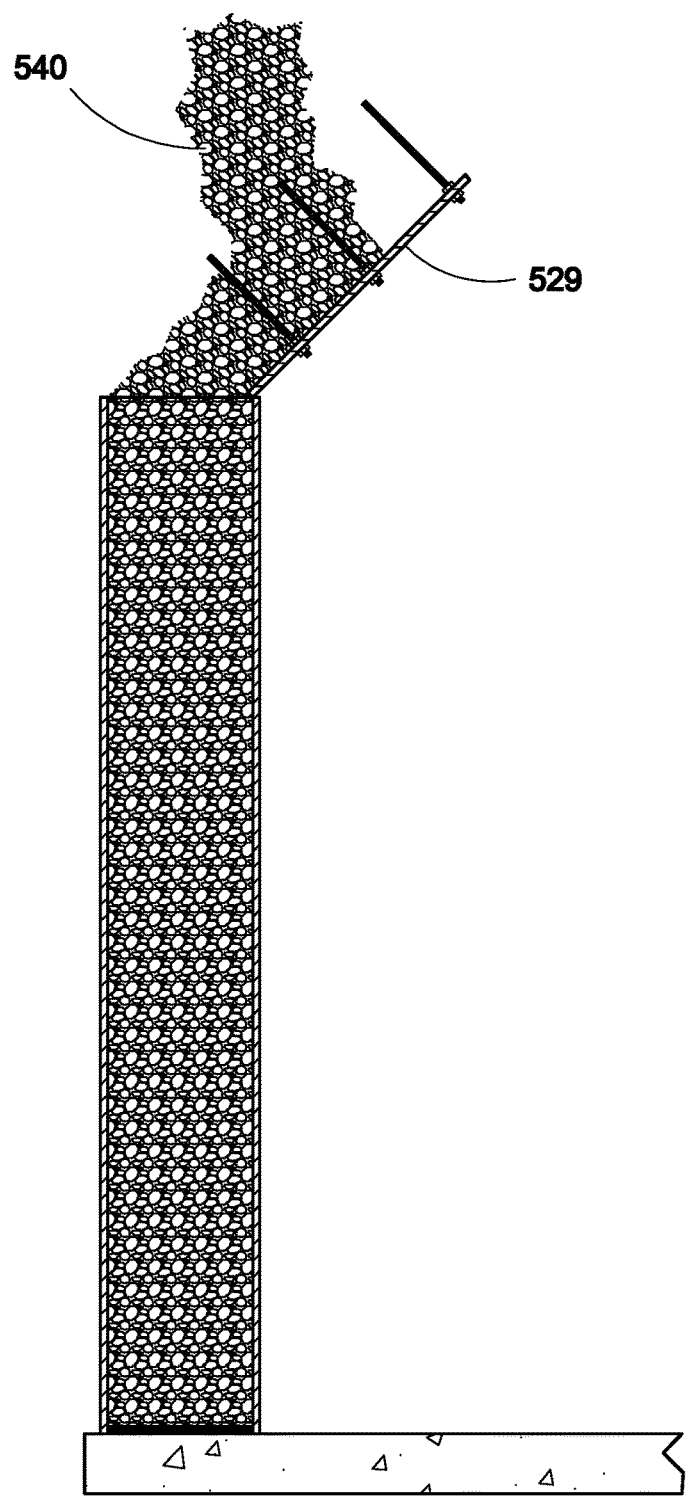

In FIG. 5F, wetted coated shredded rubber tire mix 540 is poured atop the roof structure 529.

Figure 5G:
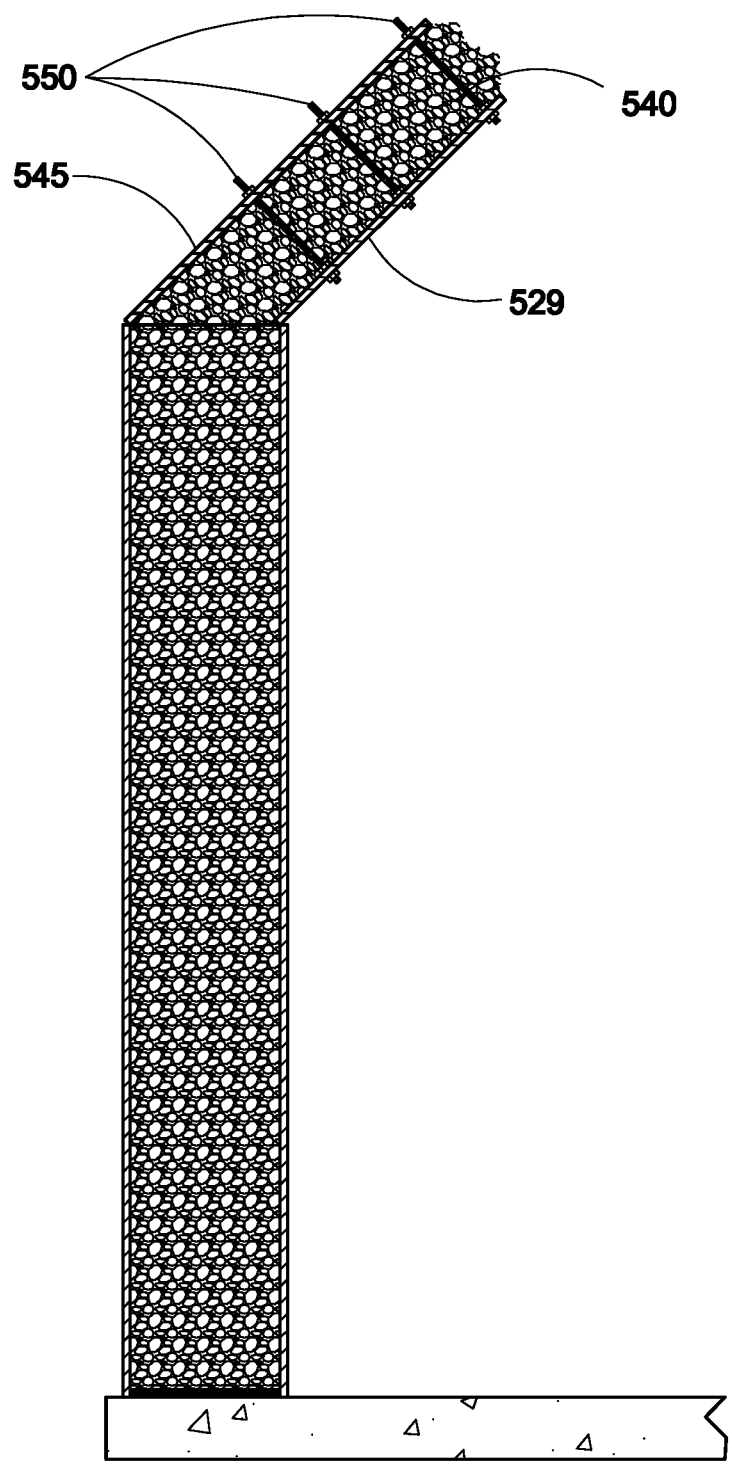

In FIG. 5G, a plywood cover 545 is placed on top of the wetted coated shredded rubber tire mix 540 that has been poured atop the roof structure 529 and is attached to metal rods 550, wherein the cover 545 is tightened to compress the wetted coated shredded rubber tire mix 540 during drying.

Figure 5H:
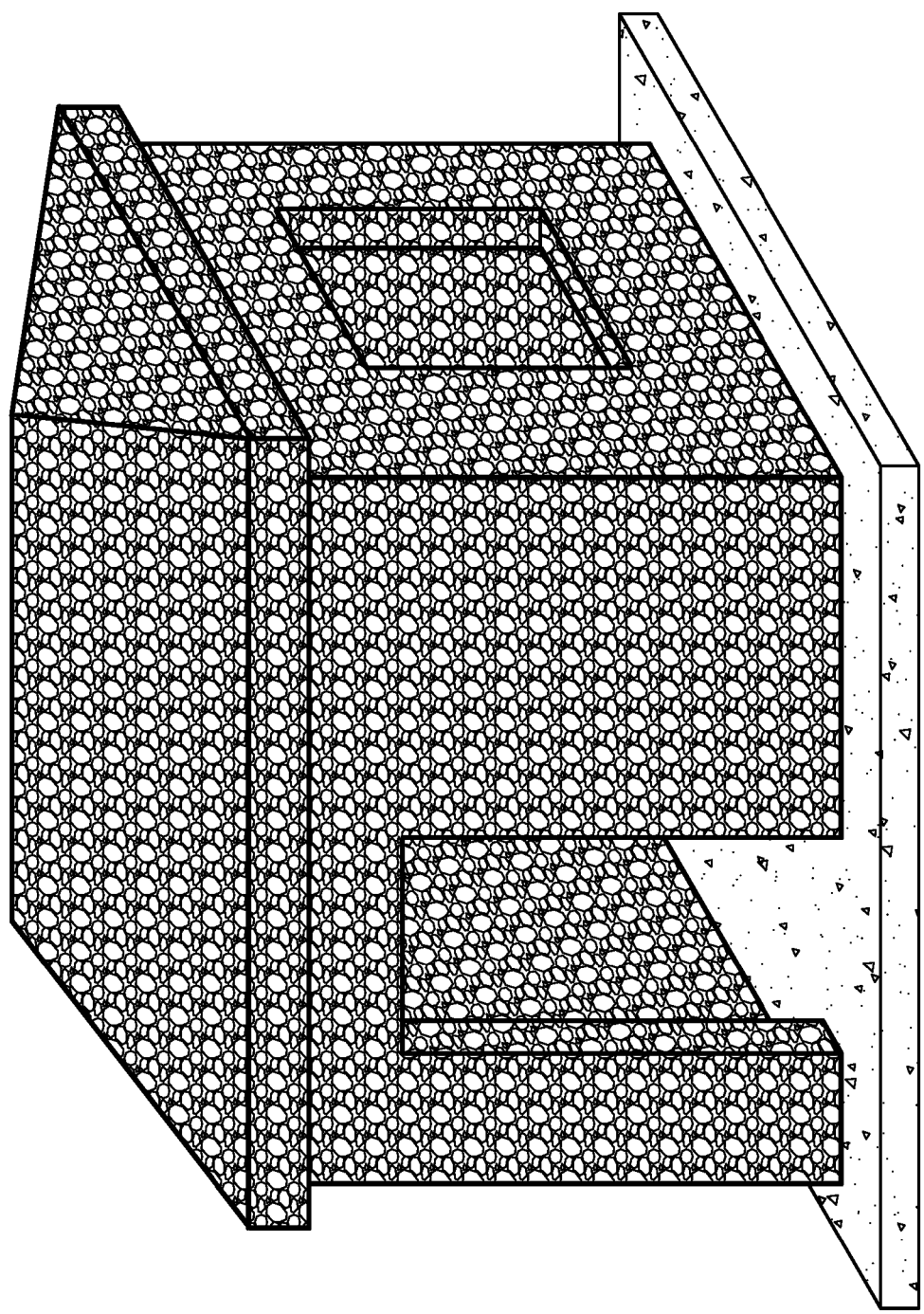

In FIG. 5H, once the wetted coated shredded rubber tire mix 540 is dried, the cover 545 and molds 525 are removed and a structure made of an environmentally responsible insulating mixture of shredded rubber tire pieces coated with silica fume, slag cement, cement and water is formed.

Figure 6:
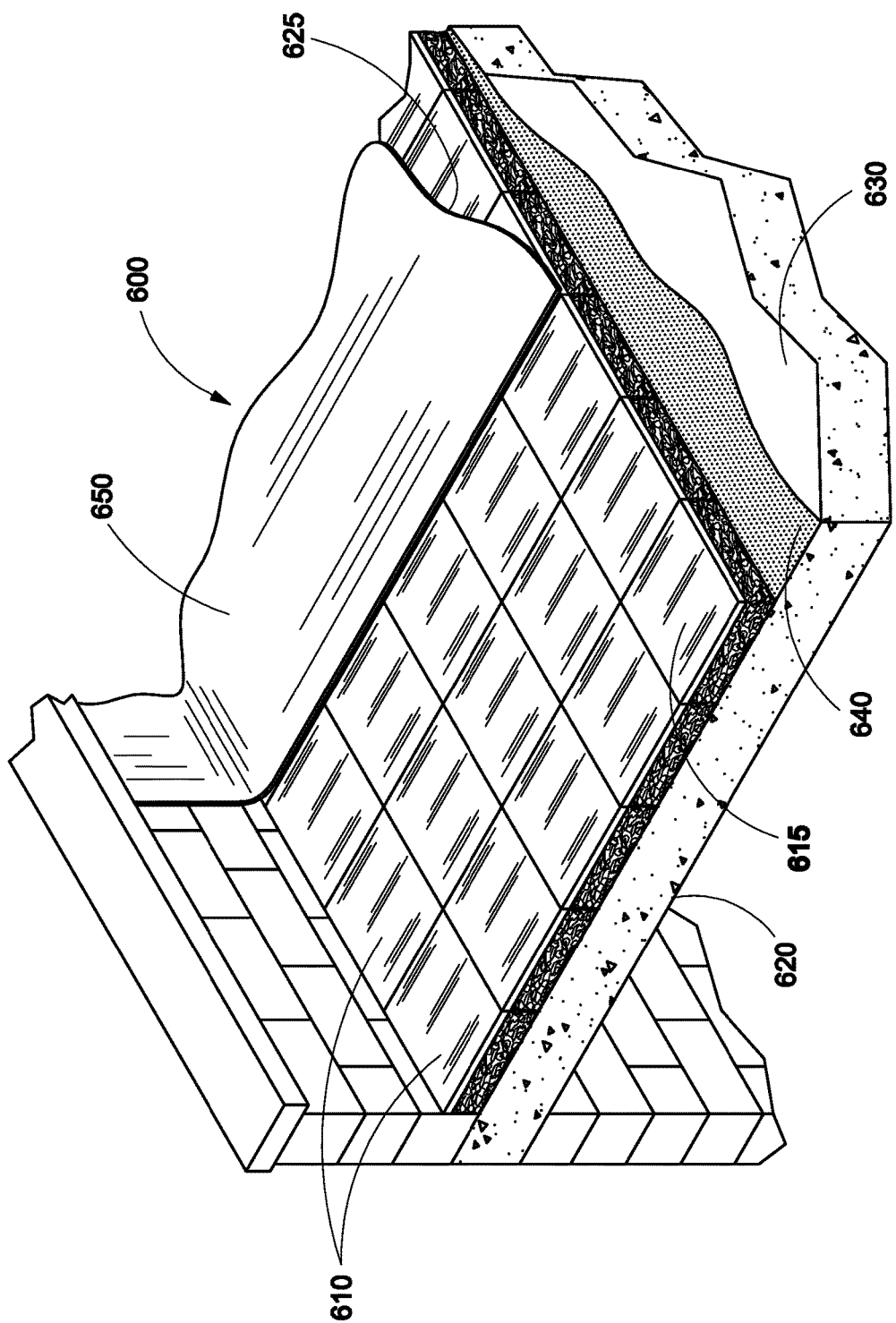
FIG. 6 depicts a roofing system comprising an environmentally responsible insulating construction block for green roofing application according to one embodiment of the invention.

FIG. 6 depicts one embodiment of a green roofing application 600 comprising environmentally responsible insulated construction blocks 610. The green roofing application 600 comprises a low slope roof structure 620 that includes a metal or concrete deck 630 and a plurality of environmentally responsible insulated construction blocks 610.

Environmentally responsible insulated construction blocks 610 are attached to the metal or concrete deck 630 using high strength self-setting grout 640, and a waterproof membrane 650 is disposed on an adhesive or glue layer 625 that is disposed on the top surfaces 615 of the environmentally responsible insulated construction blocks 610.

In one embodiment, waterproof membrane 650 comprises any membrane known today or later developed for roofing or other construction purposes. Waterproof membrane 650 may vary according to the use and the climate of the construction.

FIGS. 7A-7G depict the steps of manufacturing environmentally responsible insulating construction blocks according to one embodiment of the invention.

In FIG. 7A, a dry mixture is made from silica fume, slag cement and cement.

In FIG. 7B, shredded tire pieces are added to the dry mixture and mixed until coated.

Figure 7C:
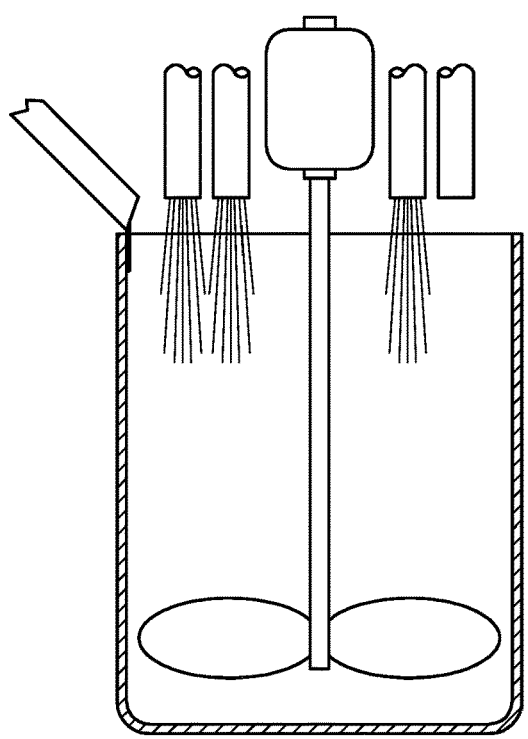
Figure 7C:
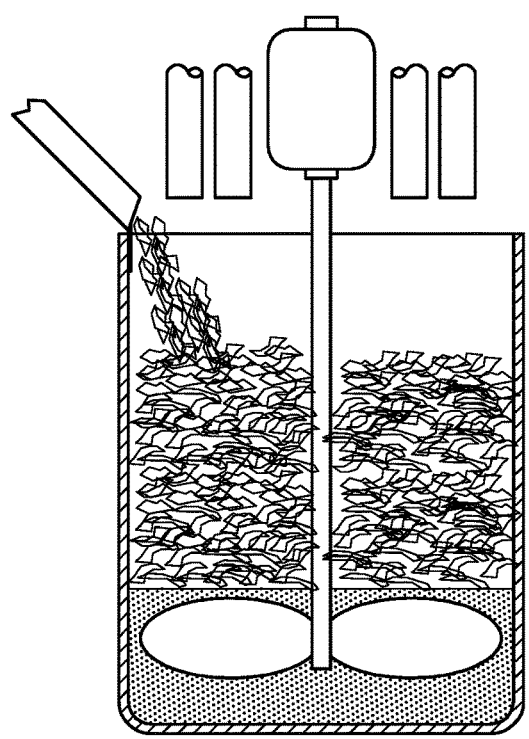
Figure 7C:
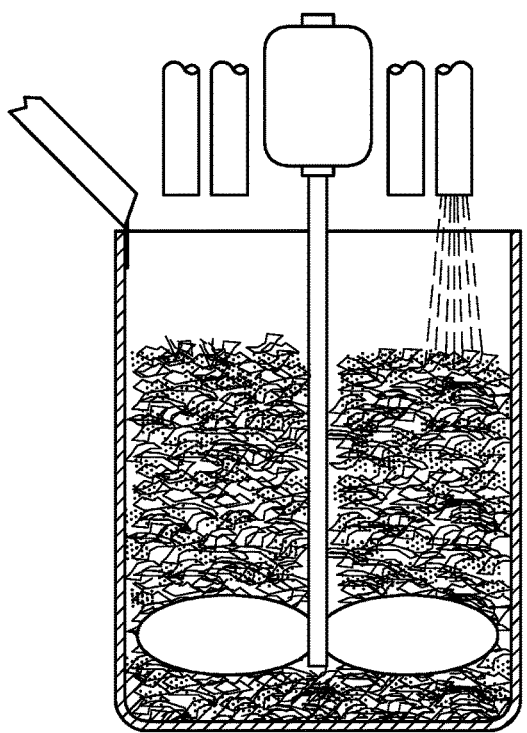

In FIG. 7C, water is added to the dry mix until the dry mix is fully wetted.

Figure 7D:
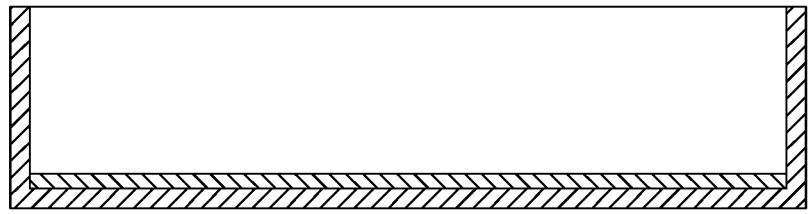

In FIG. 7D, molds are prepared and a layer of grout is added to the bottom of each mold.

Figure 7E:
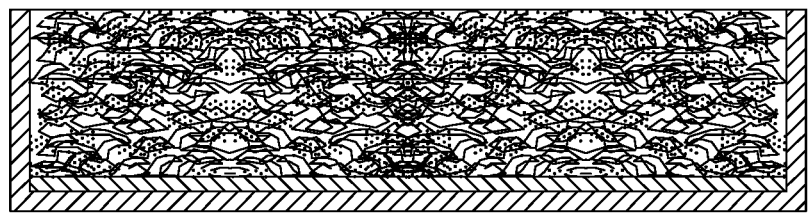

In FIG. 7E, the wetted mix is added into each mold until full.

Figure 7F:
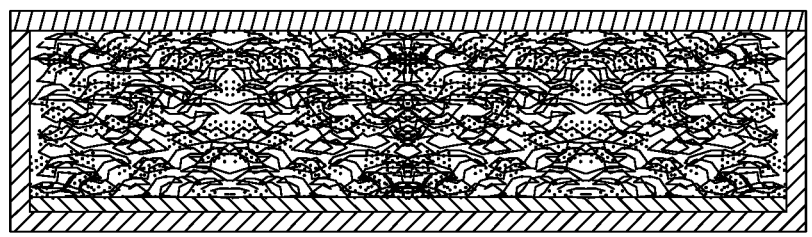

In FIG. 7F, each mold is fitted with a lid and left to sit in ambient air until dry.

Figure 7G:
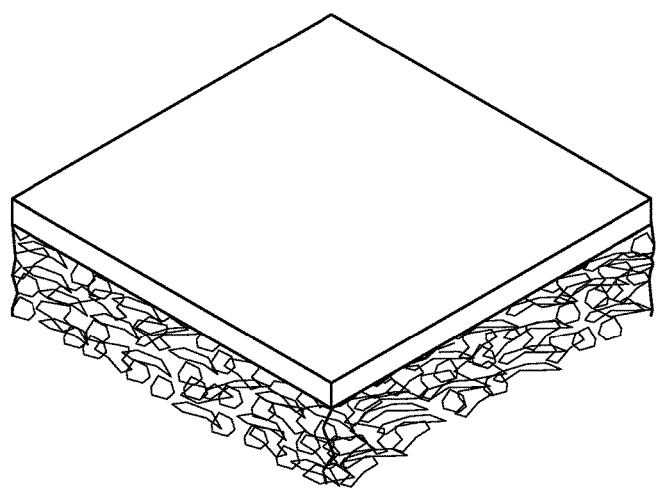

In FIG. 7G, the dried environmentally responsible insulating construction blocks are removed from the molds and are ready for use.

EXAMPLES

The following examples illustrate the manufacture and characteristics of environmentally responsible insulated construction blocks in further detail. These examples are exemplary only and in no way limit or are intended to limit the scope of this invention.

Example 1

Manufacture of an Environmentally Responsible Insulated Construction Block for Green Decking Application.

Approximately 1 gallon of silica fume weighing 6.4 lbs., approximately 1 gallon of slag cement weighing 9.2 lbs. and approximately 1.5 gallons of Portland cement weighing 15.3 lbs. were mixed together for at least 2 minutes. Rubber tires were shredded to a size range of approximately ½" to 2 inches wherein the steel from the tires was removed but nylon from the tires remained in the shredded rubber tire pieces. Seventy-five (75) lbs. of the shredded tire pieces were added to the mix, and the resulting mixture was mixed for another five (5) minutes. Thereafter, 2 gallons of water were added to wet the dry shredded rubber tire mixture.

Separately, 3 gallons of expanded slate was mixed with 25.6 oz. slag cement, 25.6 oz. silica fume and 38.4 oz. Portland cement were mixed together for at least five (5) minutes. Thereafter, 51.2 oz. water were added to wet the dry expanded slate mixture.

A layer of the wetted shredded rubber tire mixture was poured into molds sized 12 inches by 12 inches by 4 inches deep to which approximately 1 inch of the wetted expanded slate mixture had previously been added. The molds were filled and a lid closed over the mold and left to dry for 5 days at room temperature in the ambient environment. Once the mixture was dry in each mold, the resulting environmentally responsible insulated construction blocks were removed and were ready for use in green decking applications.

Example 2

Environmentally responsible insulated construction blocks for green decking application were prepared as in Example 1 except that the bottom of the mold is sloped.

The dried environmentally responsible insulated construction blocks have a sloped top surface comprising expanded slate.

Example 3

[Manufacture of an Environmentally Responsible Insulated Construction Block for Green Roofing Application.

Environmentally responsible insulated construction blocks for green roofing applications were prepared by mixing together 1 gallon of silica fume weighing 6.4 lbs., approximately 1 gallon of slag cement weighing 9.2 lbs. and approximately 1.5 gallons of Portland cement weighing 15.3 lbs. for at least 2 minutes. Rubber tires were shredded to a size range of approximately ½" to 2 inches wherein the steel from the tires was removed but nylon from the tires remained in the shredded rubber tire pieces. Seventy-five (75) lbs. of the shredded tire pieces were added to the mix, and the resulting mixture was mixed for another five (5) minutes. Thereafter, 2 gallons of water were added to wet the dry shredded rubber tire mixture. When the mixture was fully wetted, the mixture was poured into molds sized 12 inches by 12 inches and having a thickness of around 4 inches to which ½ inch of grout had previously been added. The molds were filled and a lid closed over the mold and left to dry for 5 days at room temperature in the ambient environment. Once the mixture was dry in each mold, the resulting environmentally responsible insulated construction blocks were removed and then attached to the metal or concrete deck of the top of a building using high strength self-setting grout. A waterproof membrane was disposed on an adhesive or glue layer that was disposed on the top surfaces of the environmentally responsible insulated construction blocks. Thereafter a plurality of the environmentally responsible insulated construction blocks prepared as in Example 2 were adhered to the waterproof membrane in a green roofing application.

Example 4

The environmentally responsible insulated construction blocks for green decking application were tested alone and as attached to various roofing systems, and also environmentally responsible insulated construction blocks for green roofing application as described in Example 3 for the following: wind uplift testing; Class A fire rating; field withdrawal resistance testing; metal edge attachment testing; sound transmission loss; compression testing; steady-state thermal transmission properties; flow of water; age testing; and recycled content, as well as physical properties testing. The results are presented below.

TAS 114-95 Wind uplift testing.

Environmentally responsible insulated construction block for green roofing application adhesive foam attached to 2" extruded polystyrene insulation—at 502.5 PSF no failure recorded Environmentally responsible insulated construction block for green decking application over environmentally responsible insulated construction block for green roofing application adhesive foam attached to 2" polystyrene insulation—failure at 387.5 PSF Paver on environmentally responsible insulated construction block for green decking application over environmentally responsible insulated construction block for green roofing application attached to concrete slab with grout—failure at 400 PSF Artificial turf on environmentally responsible insulated construction block for green decking application over environmentally responsible insulated construction block for green roofing application attached to concrete slab with grout—failure at 330 PSF Environmentally responsible insulated construction block for green roofing application attached to concrete slab via grout—failure at 222.5 PSF Paver on environmentally responsible insulated construction block for green decking application over environmentally responsible insulated construction block for green roofing application adhesive foam attached to 2" polystyrene insulation—failure at 300 PSF UL 790 Class A Fire Rating.

4" environmentally responsible insulated construction block for green roofing application at infinite slope 1½ ft. no ignition test—PASS 4" thick environmentally responsible insulated construction block for green decking application with artificial turf slope ¼". Melt on test sample is 30 inches no ignition test—PASS 4" thick environmentally responsible insulated construction block for green decking application with artificial turf slope ¼". Melt on test sample is 27 inches no ignition test—PASS 4" thick environmentally responsible insulated construction block for green roofing application at 3" slope. Surface char 2 ft. no ignition test—PASS TAS-105 Field Withdrawal Resistance Testing.

Ten environmentally responsible insulated construction block for green decking application were tested for Withdrawal Resistance Testing. Fastener used 3½" Spade Point Headlok Fastener by Olympic Fasteners, Inc. The selected estimator value "t" based on statistical 95% probability Tvp=2.262. The calculated mean FM=a/N(Sum Fi)=364.0. The calculated standard deviation $(SF)=Sqrt[((1/N-1)(Sum(Fi-FM)^2))]=$ 110.294. The % deviation (PD)=30.30%. According to TAS 105-11 (FBC 2114 & FM 1-52), F2014=FM-(Tvp)(SF/Sqrt N), here F2014=285.11. The MCRF14 (Minimum Characteristic Resistance Force)= F2014=285.11.

TAS-111(B)-95 Metal Edge Attachment Testing.

Environmentally responsible insulated construction block for green roofing application was tested by PRI Construction Materials Technologies, Inc. for the pullout values of a drip edge. Horizontal loads were applied in 50 lbf increments for 60 seconds beginning with a 300 lbf load. After each loading interval, the load was reduced to zero and maintained for 120 seconds prior to incrementing the load and additional 50 lbf load. The average failure load was 350 lbf, with maximum pressure of 1050 psf.

ASTM E90-09 Sound Transmission Loss.

Environmentally responsible insulated construction block for green roofing application STC=39 OITC=36

ASTM C39 Compression Testing.

Environmentally responsible insulated construction block for green roofing application 7 Days 80 PSI
28 Days 89 PSI
28 Days 96 PSI
56 Days 94 PSI Environmentally responsible insulated construction block for green decking application 7 Days 96 PSI
28 Days 89 PSI
28 Days 83 PSI
56 Days 87 PSI ASTM C-518 Standard Test Method of Steady-State Thermal Transmission Properties by means of Heat Flow Meter Apparatus.

Environmentally responsible insulated construction block for green roofing application R-Value=1.3127 per inch UL Flow Rate of Water Passing Thru Environmentally Responsible Insulated Construction Blocks for Green Decking Application.

4" Thick environmentally responsible insulated construction block for green decking application Prewetting Time Elapsed 20 Seconds, 8 LBS of water poured, 7.4 lbs of water collected, 0.6 lbs water retained Testing Time Elapse 35 Seconds, 40 lbs of water poured, 38.7 lbs of water collected, 1.3 lbs water retained 12" Thick Sample Prewetting Time Elapsed 55 seconds, 8 lbs of water poured, 6.6 lbs collected, 1.4 lbs of water retained Testing Time Elapsed 65 Seconds, 40 lbs of water poured, 38.4 lbs water collected, 1.6 lbs of water absorbed.

Age Testing.

Environmentally responsible insulated construction block for green roofing application was tested at PRI Construction Materials Technologies, Inc. for aging by exposure to UV light at a constant temperature for 5000 hours under AC 48 UV light.

Physical Properties Testing.

Environmentally responsible insulated construction block for green roofing application was tested at PRI Construction Materials Technologies, Inc. for physical properties testing, specifically flexural strength of concrete using ASTM C293-16 and for Impact Resistance under UL 2218.

ASTM C293—Pre-weathering: 367 lbs.; post-weathering: 415 lbs. (5000 hrs. AC 48 UV weathering)

UL2218 Class 4 Impact Hail Test (Steel Ball)—Passed

Recycled Content.

Environmentally responsible insulated construction block for green roofing application and environmentally responsible insulated construction block for green decking application were both certified by SCS Global Services for recycled content.

Environmentally responsible insulated construction block for green roofing application—4" thick—87.53% recycled content by volume Environmentally responsible insulated construction block for green roofing application—8" thick—90.57% recycled content by volume Environmentally responsible insulated construction block for green decking application—4" thick—80.59% recycled content by volume Environmentally responsible insulated construction block for green decking application—4" thick—86.18% recycled content by volume Maximum Design Pressure (Steel Deck).

A plurality of environmentally responsible insulated construction blocks for green roofing application having a ¼" slope was adhered using AH-160 propack adhesive continuous 1½ inch beads spaced 6" O.C. to min. 22GA 1.5" Type B galvanized steel deck. An 8000 psi structural concrete surface was adhered to the top surface of the plurality of environmentally responsible insulated construction blocks for green roofing application to which was applied a NOA-approved fully adhered roofing system. The maximum design pressure measured was −292.5 psf.

Example 5

A structure having four walls and a roof was built using the coated shredded rubber tire mixture of EXAMPLE 3. A scarified concrete slab was poured as the base of the structure. Molds for walls of about twelve (12) inches thickness were constructed and a layer of grout was placed over the scarified concrete slab at the base of the molds. Metal rods were inserted from the base to extend beyond the tops of the molds. A plywood sheet was placed on top of the poured coated shredded rubber tire mixture to provide compression to the mixture while it dried. A roof structure was built on the top of the walls using plywood. A layer of the coated shredded rubber tire mixture twelve (12) inches thick was poured on the plywood layer to form the roof. The roof was thereafter coated with stucco and roof paint. A plurality of rods extended upward from the plywood layer to allow for a top to be placed over the poured coated shredded rubber tire mixture to compress it while it dried.

The structure comprising was tested and found to have a load bearing capacity of 20,106 lbs. During testing, the structure sagged ¼ inch due to weight load but the sag decreased to ⅛ inch when the weight was removed. The structure was measured to have an R-value of 15.72 with a recycled content of about 93.83%.

In the foregoing description, the invention has been described with reference to specific exemplary embodiments thereof. It will be apparent to those skilled in the art that a person understanding this invention may conceive of changes or other embodiments or variations, which utilize the principles of this invention without departing from the broader spirit and scope of the invention. The specification and drawings are, therefore, to be regarded in an illustrative rather than a restrictive sense.

What is claimed is:

1. A method of manufacturing an environmentally responsible insulated construction block for green roofing application comprising:

mixing a first mix of substantially dry silica fume, slag cement and cement;

thereafter adding shredded rubber tire pieces to the first mix and mixing until the shredded rubber is substantially completely coated;

thereafter adding water until the mix of silica fume, slag cement, cement and shredded rubber tire pieces is fully wetted;

mixing a second mix of substantially dry silica fume, slag cement and cement;

thereafter adding shredded pieces of a fireproof material to the second mix and mixing until the pieces of fireproof material are substantially completely coated;

thereafter adding water until the mix of silica fume, slag cement, cement and pieces of fireproof material are fully wetted;

thereafter pouring a layer of the wetted fireproof material mix to the bottom of a mold;

thereafter pouring the wetted shredded rubber mixture into the mold on top of the layer wetted fireproof material mix until the mold is substantially full;

fitting the mold with a lid; and allowing the mold to dry.

2. The method of claim 1, wherein the fireproof material comprises expanded slate.

3. The method of manufacturing an environmentally responsible insulated construction block of claim 1, wherein the mold dries in ambient air.

4. The method of manufacturing an environmentally responsible insulated construction block of claim 1, wherein the shredded rubber tire pieces range in size between about ½ inch and 2 inches.

* * * * *